( 12 ) United States Patent
Arisawa et al.

(10) Patent No.: US 9,209,738 B2
(45) Date of Patent: Dec. 8, 2015

(54) INDUCTION LOAD DRIVING SYSTEM

(71) Applicant: PANASONIC CORPORATION, Osaka (JP)

(72) Inventors: Daijiro Arisawa, Kyoto (JP); Masako Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 489 days.

(21) Appl. No.: 13/758,547

(22) Filed: Feb. 4, 2013

(65) Prior Publication Data

US 2013/0147278 A1 Jun. 13, 2013

Related U.S. Application Data

(63) Continuation of application No. PCT/JP2011/002791, filed on May 19, 2011.

(30) Foreign Application Priority Data

Jan. 20, 2011 (JP) ................................. 2011-009917

(51) Int. Cl.
H02P 29/00 (2006.01)
H02P 8/12 (2006.01)
H02J 4/00 (2006.01)
H01F 27/42 (2006.01)
H02M 1/00 (2007.01)

(52) U.S. Cl.
CPC . *H02P 29/00* (2013.01); *H02J 4/00* (2013.01); *H02P 8/12* (2013.01); *H02M 2001/0009* (2013.01); *Y10T 307/675* (2015.04)

(58) Field of Classification Search
USPC ........................................................ 307/412
See application file for complete search history.

(56) References Cited

U.S. PATENT DOCUMENTS 6,184,665 B1   2/2001   Salina et al.
6,424,131 B1   7/2002   Yamamoto et al.

FOREIGN PATENT DOCUMENTS

| JP | 48-92836      | 12/1973 |
| JP | 48-092836 A   | 12/1973 |
| JP | 9-009691 A    | 1/1997  |
| JP | 11-215885 A   | 8/1999  |
| JP | 2007-087541 A | 4/2007  |
| JP | 2008-072876 A | 3/2008  |
| JP | 4355463 B2    | 11/2009 |

OTHER PUBLICATIONS

International Search Report issued in International Patent Application No. PCT/JP2011/002791 mailed Aug. 2, 2011.

*Primary Examiner* — Robert Deberadinis
(74) *Attorney, Agent, or Firm* — McDermott Will & Emery LLP

(57) ABSTRACT

When a direction command signal indicates a first direction, a signal for causing the other end of the induction load to be connected to a second power supply unit is output as a second control signal. In addition, after a passage of a first predetermined delay time after a first current detection value becomes less than a reference value of a conducting current, a signal for causing the one end of the induction load 5 to be connected to a first power supply unit is output as a first control signal. And, after a passage of a second predetermined delay time after the first current detection value becomes equal to or greater than the reference value of the conducting current, a signal for causing the one end of the induction load to be connected to the second power supply unit is output as the first control signal.

7 Claims, 9 Drawing Sheets

INDUCTION LOAD DRIVING SYSTEM

This is a continuation application under 35 U.S.C. 111(a) of pending prior International Application No. PCT/JP2011/002791, filed on May 19, 2011.

BACKGROUND OF THE INVENTION

1. Field of the Invention

The present invention relates to an induction load driving system for driving an induction load of a stepping motor, etc..

2. Description of the Related Art

As a method of driving an induction load of a stepping motor, etc., for use with an optical disc device, a micro-step driving method is used. In the micro-step driving method, a ratio between amounts of currents flowing through a plurality of induction loads is changed finely, thereby controlling a rotational angle of a rotor with high accuracy.

In recent years, there has been a need for a smaller-sized optical disc device with reduction of a size of equipment incorporating the optical disc device, such as a notebook-size personal computer. With reduction of the size of the optical disc device, there has been a need for a smaller-sized stepping motor. As disclosed in Japanese Laid-Open Patent Application Publication No. 2007-87541, an optical disc device incorporates a small-sized stepping motor for moving an optical pickup, a smaller-sized stepping motor, etc., for moving a spherical aberration correction lens of the optical disc device using 3-wavelength lasers including a blue laser, etc.. Thus, these stepping motors are required to have a smaller size. Because of a limitation of a winding number, etc., of the induction load (coil) of the stepping motor, in these stepping motors, their inductances are lower than those of general stepping motors. Therefore, it becomes necessary to stably drive a current supplied to induction loads of low impedances.

Conventionally, there is known an induction load driving system used for the micro-step driving (see Japanese Laid-Open Patent Application Publication Nos. 2008-72876 and Hei. 11-215885). First of all, a configuration disclosed in Japanese Laid-Open Patent Application Publication No. 2008-72876 will be described. FIG. 7 is a schematic circuit diagram showing an exemplary conventional induction load driving system. As shown in FIG. 7, in the induction load driving system disclosed in Japanese Laid-Open Patent Application Publication No. 2008-72876, a current detection circuit 105 detects and feeds back a current flowing through a H-bridge circuit 102, 103 which uses a signal generated in an oscillator 108 as a carrier frequency in PWM (pulse width modulation) control and is capable of flowing a current bidirectionally through an induction load 101 (coil A,B) using four switching elements. The current detection circuit 105 detects a voltage applied to a detection resistor RS1, RS2 provided between the H-bridge circuit 102, 103 and a ground. A PWM signal generating circuit 104 compares a voltage value based on a current detected by the current detection circuit 105 to a voltage level of a maximum current setting signal, and generates a signal of a PWM driving waveform, to turn ON or OFF of the H-bridge circuit 102, 103, according to a result of the comparison.

Next, the configuration disclosed in Japanese Laid-Open Patent Application Publication No. Hei. 11-215885 will be described.

FIG. 8 is a schematic circuit diagram showing another exemplary conventional induction load driving system. In the induction load driving system disclosed in Japanese Laid-Open Patent Application Publication No. Hei. 11-215885 in a H-bridge circuit, a detection resistor 201 is connected in series with an induction load 202 to detect a current flowing through the induction load 202. A resistor R1, R2 converts the detected current into a voltage via an amplifier 203 as an average current flowing through the induction load 202, then an error amplifier 204 amplifies an error with a reference voltage Vref, and then a comparator 205, 206 compares the amplified voltage to a triangular wave which is a carrier frequency, thereby performing feedback control.

SUMMARY OF THE INVENTION

However, in the configuration disclosed in Japanese Laid-Open Patent Application Publication No. 2008-72876, the current detection circuit 105 compares the current flowing through the induction load 101 to a preset maximum value, and control is executed. Comparison and control are not performed regarding a current value in OFF-state of the H-bridge circuit or a minimum value of the current. In a state in which the H-bridge circuit 102, 103 is OFF, a current flows back within the H-bridge circuit 102, 103, or returns to a power supply side by a diode provided in the H-bridge circuit 102, 103. Therefore, no current flows in the resistor RS1, RS2 provided between the H-bridge circuit 102, 103 and the ground and therefore the current flowing through the induction load cannot be detected. Thus, the current in the OFF-state of the H-bridge circuit cannot be detected, which makes it impossible to perform control in an OFF time. In the configuration disclosed in Japanese Laid-Open Patent Application Publication No. 2008-72876, an OFF-operation of the H-bridge circuit is performed based on a signal waveform output from the oscillator 108. If this induction load driving circuit is applied to the smaller-sized stepping motor in which a time constant of the induction load is low, the current changes steeply. Because of this, a current ripple increases, and non-uniformity of an average current occurs. If the non-uniformity of the average current occurs, it becomes difficult to carry out accurate position control and smooth rotation at a low speed, especially in the optical disc device using a plurality of induction loads. In addition, a circuit configuration for generating a PWM waveform is complex, which makes it impossible to reduce a circuit scale.

Likewise, in the configuration disclosed in Japanese Laid-Open Patent Application Publication No. Hei. 11-215885, the ON-operation or the OFF-operation of the H-bridge circuit is controlled based on the predetermined triangular wave. Therefore, if this configuration is applied to the small-sized stepping motor in which the time constant of the induction load is low, the current ripple increases, or the current oscillates. If a low pass filter is provided or a triangular wave which is a reference is generated with a high frequency and high accuracy to prevent the oscillation, a circuit scale increases.

In particular, in the conventional example, the size of the induction load is not so large. Therefore, a time constant of the induction load is sufficiently large with respect to a driving frequency, and the current ripple affects less driving of the induction load. However, as described above, development for a smaller size and a higher speed of the induction load has been progressing. Because of this, the inductance of the induction load is relatively small with respect to the time constant, and the current ripple affects more driving of the induction load. Under the circumstances, the above problem becomes obvious.

FIG. 9 is a view showing a current waveform with respect to a control signal for describing the problem associated with the conventional induction load driving system. As shown in FIG. 9, for example, when a command value of a current flowing through the induction load is closer to a saturation current of the induction load and thereby a duty ratio of a control signal becomes greater, a reduction amount of a current per unit time increases during an OFF-period, which causes a rapid change in the current. However, in the conventional configuration, control is not executed during the OFF-period, and therefore, a current having been changed rapidly is output, and the current ripple increases. Or, an increase amount of the current per unit time is small during an ON-period, and the ON-period shifts to the OFF-period in a state in which the current does not reach the current command value yet, which distorts a current waveform. Thus, highly accurate current control cannot be executed.

The present invention is directed to solving the above described problem, and an object of the present invention is to provide an induction load driving system capable of reducing a current ripple for an induction load having a low time constant with a simple configuration.

According to an aspect of the present invention, there is provided an induction load driving system comprising: a H-bridge circuit including four switching elements which are two switching elements connected to one end of an induction load and two switching elements connected to the other end of the induction load, the H-bridge circuit being connected between a first power supply unit and a second power supply unit in which its voltage is different from a voltage of the first power supply unit; and a control signal generating circuit configured to, according to a direction in which the conducting current flows through the induction load, generate a control signal to fix a state in which the two switching elements connected to one of the one end and the other end of the induction load are exclusively turned ON, and to perform switching to exclusively turn ON the two switching elements connected to the other of the one end and the other end of the induction load based on the conducting current flowing through the induction load; wherein the control signal generating circuit is configured to exclusively turn ON the two switching elements connected to the other of the one end and the other end of the induction load to increase the conducting current after a passage of a first predetermined delay time after the conducting current becomes less than a preset reference value of the conducting current when the conducting current becomes less than the preset reference value, and the control signal generating circuit is configured to exclusively turn ON the two switching elements connected to the other of the one end and the other end of the induction load to decrease the conducting current after a passage of a second predetermined delay time after the conducting current becomes equal to or greater than the preset reference value of the conducting current when the conducting current becomes equal to or greater than the preset reference value.

In accordance with this configuration, in a state (back-flow state) in which switching of the H-bridge circuit is performed such that the conducting current flowing through the induction load decreases with a passage of time by connecting both ends of the induction load to the second power supply unit, a value of the conducting current is compared to the reference value, and when it is determined that the value of the conducting is less than the reference value, switching of the H-bridge circuit is performed to increase the conducting current flowing through the induction load after a passage of the first predetermined delay time after the determination. On the other hand, in a state (bias state) in which switching of the H-bridge circuit is performed by connecting both ends of the induction load to the first power supply unit and to the second power supply unit such that the conducting current flowing through the induction load decreases with a passage of time, a value of the conducting current is compared to the reference value, and when it is determined that the value of the conducting is equal to or greater than the reference value, switching of the H-bridge circuit is performed to decrease the conducting current flowing through the induction load after a passage of the second predetermined delay time after the determination. In this way, the ON-operation and the OFF-operation of the H-bridge circuit is performed according to the conducting current flowing through the induction load. Therefore, a current ripple can be reduced irrespective of a time constant of the induction load. In addition, since it is not necessary to use a carrier frequency, a circuit configuration is simplified. As a result, the current ripple can be reduced even for the induction load with a low time constant with a simple configuration.

In the induction load driving system, the H-bridge circuit may include: a first switching element having a main terminal one end of which is connected to the first power supply unit and the other end of which is connected to the one end of the induction load; a second switching element having a main terminal one end of which is connected to the second power supply unit in which its voltage is different from the voltage of the first power supply unit and the other end of which is connected to the one end of the induction load; a third switching element having a main terminal one end of which is connected to the first power supply unit and the other end which is connected to the other end of the induction load; and a fourth switching element having a main terminal one end of which is connected to the second power supply unit and the other end of which is connected to the other end of the induction load; wherein the control signal generating circuit may be configured to: receive as inputs a direction command signal for switching a direction of the conducting current flowing through the induction load between a first direction from the one end of the induction load toward the other end of the induction load and a second direction from the other end of the induction load toward the one end of the induction load, and a current command signal for setting a reference value of the conducting current flowing through the induction load, on the basis of the voltage (reference voltage) of the second power supply unit, and based on the command direction signal and the current command signal, generate a first control signal for causing the first switching element and the second switching element to be exclusively turned ON to connect the one end of the induction load to the first power supply unit or to the second power supply unit and outputs the first control signal to a control terminal of the first switching element and to a control terminal of the second switching element, and generate a second control signal for causing the third switching element and the fourth switching element to be exclusively turned ON to connect the other end of the induction load to the first power supply unit or to the second power supply unit and outputs the second control signal to a control terminal of the third switching element and to a control terminal of the fourth switching element; wherein the control signal generating circuit may be configured to: when the direction command signal indicates the first direction, output as the second control signal a signal for causing the other end of the induction load to be connected to the second power supply unit, detect a value (hereinafter referred to as first current detection value) based on the conducting current flowing through the induction load and compare the first current detection value to the reference value of the conducting current, output as the first control signal a signal for causing the one end of the induction load to be connected to the first power supply unit after a passage of a first predetermined delay time after the first current detection value has become less than the reference value of the conducting current, when the first current detection value has become less than the reference value of the conducting current, and output as the first control signal a signal for causing the one end of the induction load to be connected to the second power supply unit after a passage of a second predetermined delay time after the first current detection value has become equal to or greater than the reference value of the conducting current, when the first current detection value has become equal to or greater than the reference value of the conducting current, and wherein the control signal generating circuit may be configured to: when the direction command signal indicates the second direction, output as the first control signal a signal for causing the one end of the induction load to be connected to the second power supply unit, detect a value (hereinafter referred to as second current detection value) based on the conducting current flowing through the induction load and compare the second current detection value to the reference value of the conducting current, output as the second control signal a signal for causing the other end of the induction load to be connected to the first power supply unit after a passage of the first predetermined delay time after the second current detection value has become less than the reference value of the conducting current, when the second current detection value has become less than the reference value of the conducting current, and output as the second control signal a signal for causing the other end of the induction load to be connected to the second power supply unit after a passage of the second predetermined delay time after the second current detection value has become equal to or greater than the reference value of the conducting current, when the second current detection value has become equal to or greater than the reference value of the conducting current. In this configuration, the fixed signal for causing one of the one end and the other end of the induction load to be connected to the second power supply unit in which its voltage is the reference voltage is generated according to the direction in which the conducting current flows. And, the control signal for causing the other of the one end and the other end of the induction load to be connected to either the first power supply unit or the second power supply unit is generated according to the value of the conducting current flowing through the induction load. This makes it possible to easily generate the control signal used for performing the ON-operation and the OFF-operation of the H-bridge circuit according to the conducting current flowing through the induction load.

In the induction load driving system, the first current detection value may be a voltage applied to the fourth switching element on the basis of the reference voltage; and the second current detection value may be a voltage applied to the second switching element on the basis of the reference voltage. In this configuration, the conducting current flowing through the H-bridge circuit can be easily detected by researching the ON-resistances of the switching elements which are targets, the first current detection value and the second current detection value of which are to be detected. As a result, it is possible to effectively detect the conducting current in both of the bias state and in the back-flow state without providing surplus detection resistors in the H-bridge circuit.

In the induction load driving system, the H-bridge circuit may be configured such that one end of the main terminal of the second switching element is connected to the second power supply unit via a first detection resistor element and one end of the main terminal of the fourth switching element is connected to the second power supply unit via a second detection resistor element; the first current detection value may be a voltage between the fourth switching element and the second detection resistor element on the basis of the reference voltage; and the second current detection value may be a voltage between the second switching element and the first detection resistor element on the basis of the reference value. In this configuration, since the conducting current flows through the corresponding detection resistor element in the back-flow state, it is possible to effectively detect the conducting current in both of the bias state and the back-flow state.

In the induction load driving system, the control signal generating circuit may include: a comparison unit including: a first comparator configured to compare the first current detection value to the reference value of the conducting current; a second comparator configured to compare the second current detection value to the reference value of the conducting current; and a signal selection unit; the signal selection unit being configured to, when the direction command signal indicates the first direction and the first current detection value is equal to or greater than the reference value of the conducting current according to an output of the first comparator, output as a first comparison signal a signal for causing the one end of the induction load to be connected to the second power supply unit and output as a second comparison signal a fixed signal for causing the other end of the induction load to be connected to the second power supply unit; the signal selection unit being configured to, when the direction command signal indicates the first direction and the first current detection value is less than the reference value of the conducting current according to the output of the first comparator, output as the first comparison signal a signal for causing the one end of the induction load to be connected to the first power supply unit and output as the second comparison signal the fixed signal for causing the other end of the induction load to be connected to the second power supply unit; and the signal selection unit being configured to, when the direction command signal indicates the second direction and the second current detection value is equal to or greater than the reference value of the conducting current according to the output of the second comparator, output as the second comparison signal a signal for causing the other end of the induction load to be connected to the second power supply unit, and output as the first comparison signal a fixed signal for causing the one end of the induction load to be connected to the second power supply unit; and the signal selection unit being configured to, when the direction command signal indicates the second direction and the second current detection value is less than the reference value of the conducting current according to the output of the second comparator, output as the second comparison signal a signal for causing the other end of the induction load to be connected to the second power supply unit, and output as the first comparison signal a fixed signal for causing the one end of the induction load to be connected to the first power supply unit; and a delay unit configured to generate the first control signal such that it delays for the first delay time a state change in the first comparison signal at a time point when the first current detection value becomes less than the reference value of the conducting current and it delays for the second delay time the state change in first comparison signal at a time point when the first current detection value becomes equal to or greater than the reference value of the conducting current, and generate the second control signal such that it delays for the first delay time a state change in the second comparison signal at a time point when the second current detection value becomes less than the reference value of the conducting current and it delays for the second delay time the state change in second comparison signal at a time point when the second current detection value becomes equal to or greater than the reference value of the conducting current.

In the induction load driving system, the control signal generating circuit may include: a comparison unit including: a detection value selection unit which receives as inputs the first current detection value and the second current detection value, outputs the first current detection value when the direction command signal indicates the first direction and outputs the second current detection value when the direction command signal indicates the second direction; a comparator configured to compare either the first current detection value or the second current detection value which is selected by the detection value selection unit to the reference value of the conducting current; and a signal selection unit; the signal selection unit being configured to, when the direction command signal indicates the first direction and the first current detection value is equal to or greater than the reference value of the conducting current according to an output of the comparator, output as a first comparison signal a signal for causing the one end of the induction load to be connected to the second power supply unit and output as a second comparison signal a fixed signal for causing the other end of the induction load to be connected to the second power supply unit; the control signal generating unit being configured to, when the direction command signal indicates the first direction and the first current detection value is less than the reference value of the conducting current according to the output of the comparator, output as the first comparison signal a signal for causing the one end of the induction load to be connected to the first power supply unit and output as the second comparison signal the fixed signal for causing the other end of the induction load to be connected to the second power supply unit; and the signal selection unit being configured to, when the direction command signal indicates the second direction and the second current detection value is equal to or greater than the reference value of the conducting current according to the output of the comparator, output as the second comparison signal a signal for causing the other end of the induction load to be connected to the second power supply unit, and output as the first comparison signal a fixed signal for causing the one end of the induction load to be connected to the second power supply unit; and the signal selection unit being configured to, when the direction command signal indicates the second direction and the second current detection value is less than the reference value of the conducting current according to the output of the comparator, output as the second comparison signal a signal for causing the other end of the induction load to be connected to the first power supply unit, and output as the first comparison signal the fixed signal for causing the one end of the induction load to be connected to the second power supply unit; and a delay unit configured to generate the first control signal such that it delays for the first delay time a state change in the first comparison signal at a time point when the first current detection value becomes less than the reference value of the conducting current and it delays for the second delay time the state change in first comparison signal at a time point when the first current detection value becomes equal to or greater than the reference value of the conducting current, and generate the second control signal such that it delays for the first delay time a state change in the second comparison signal at a time point when the second current detection value becomes less than the reference value of the conducting current and it delays for the second delay time the state change in second comparison signal at a time point when the second current detection value becomes equal to or greater than the reference value of the conducting current.

In these configurations, among the four switching elements constituting the H-bridge circuit, switching is performed for the two switching elements which are exclusively turned ON in response to one control signal when the conducting current flows through the induction load in the same direction. Thus, switching between the bias state and the back-flow state can be performed easily.

In the induction load driving system, the control signal generating circuit may be configured to change the first delay time and the second delay time. In this configuration, the delay times can be adjusted based on the reference value (command value) of the conducting current, and thus an output waveform of the conducting current can be adjusted properly.

The present invention has been configured as described above and has an advantage that the current ripple can be reduced even in the induction load with a low time constant with a simple configuration.

The above and further objects, features and advantages of the present invention will more fully be apparent from the following detailed description of preferred embodiments with accompanying drawings.

DETAILED DESCRIPTION OF THE PREFERRED EMBODIMENTS

Figure 1:
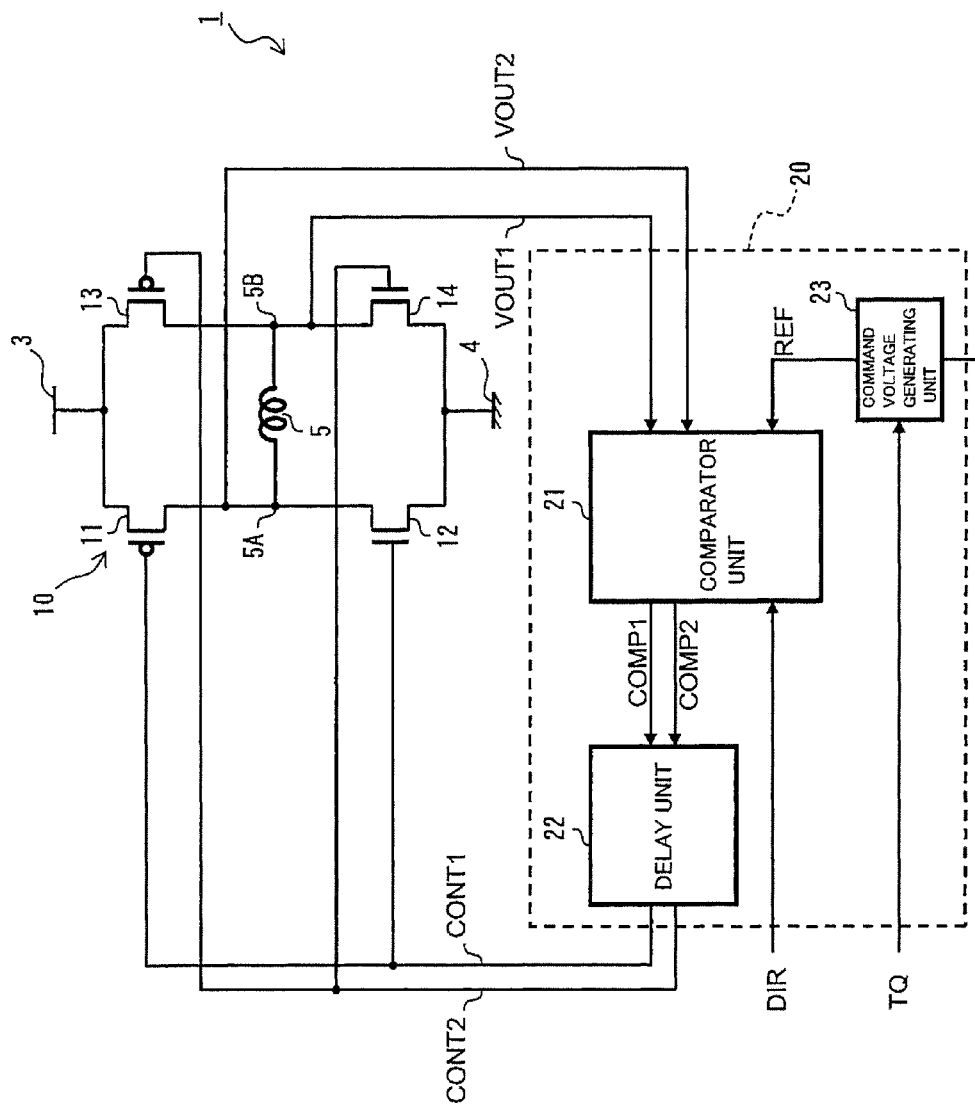
FIG. 1 is a circuit diagram showing a schematic configuration of an induction load driving system according to Embodiment 1 of the present invention.

Hereinafter, preferred embodiments of the present invention will be described with reference to the drawings. Throughout the drawings, the same or corresponding components are designated by the same reference numerals and will not be described in detail.

Embodiment 1

First of all, an induction load driving system of Embodiment 1 of the present invention will be described. FIG. 1 is a circuit diagram showing a schematic configuration of the induction load driving system according to Embodiment 1 of the present invention.

Referring to FIG. 1, an induction load driving system 1 of the present embodiment includes a H-bridge circuit 10 for bidirectionally flowing a current through an induction load 5 such as a coil, and a control signal generating circuit 20 for generating a control signal used to control switching of the H-bridge circuit 10. The H-bridge circuit 10 is provided between a first power supply unit 3 for generating a predetermined voltage and a second power supply unit 4 for generating a voltage different from the voltage of the first power supply unit 3, and is configured to flow a current from the first power supply unit 3 to the second power supply unit 4 via the induction load 5. In the present embodiment, the first power supply unit 3 generates a higher voltage than the second power supply unit 4, and the second power supply unit 4 is a ground.

The H-bridge circuit 10 includes four switching elements 11 to 14 which are connected to one end 5A and the other end 5B of the induction load 5. Specifically, the H-bridge circuit 10 includes a first switching element 11 having a main terminal one end of which is connected to the first power supply unit 3 and the other end of which is connected to one end 5A of the induction load 5, a second switching element 12 having a main terminal one end of which is connected to the second power supply unit 4 and the other end of which is connected to one end 5A of the induction load 5, a third switching element 13 having a main terminal one end of which is connected to the first power supply unit 3 and the other end of which is connected to the other end 5B of the induction load 5, and a four switching element 14 having a main terminal one end of which is connected to the second power supply unit 4 and the other end of which is connected to the other end 5B of the induction load 5. In the present embodiment, the first and third switching elements 11 and 13 are constituted by P-type MOS transistors, respectively, while the second and fourth switching elements 12 and 14 are constituted by N-type MOS transistors, respectively.

The control signal generating circuit 20 is configured to generate control signals CONT1 and CONT2 for fixing a state in which the two switching elements connected to one of the one end 5A and the other end 5B of the induction load 5 are exclusively in an ON-state according to a direction of the conducting current flowing through the induction load 5, and the two switching elements connected to the other of the one end 5A and the other end 5B of the induction load 5 are switched to be exclusively turned ON, based on the conducting current flowing through the induction load 5. More specifically, the control signal generating circuit 20 receives as inputs a direction command signal DIR for switching the conducting current flowing through the induction load 5 between a first direction from the one end 5A (side of the first and second switching elements 11, 12) of the induction load 5 to the other end 5B (side of the third and fourth switching elements 13 and 14), and a second direction from the other end 5B of the induction load 5 to the one end 5A of the induction load 5, and a current command value TQ for setting a reference value REF of the conducting current flowing through the induction load 5, and generates the first control signal CONT1 which exclusively turns ON the first switching element 11 and the second switching element 12 to connect the one end 5A of the induction load 5 to either the first power supply unit 3 or the second power supply unit 4 based on the direction command signal DIR and the current command value TQ, and the second control signal CONT2 which exclusively turns ON the third switching element 13 and the fourth switching element 14 to connect the other end 5B of the induction load 5 to either the first power supply unit 3 or the second power supply unit 4 based on the direction command signal DIR and the current command value TQ. The control signal generating circuit 20 outputs the first control signal CONT1 to the control terminal of the first switching element 11 and to the control terminal of the second switching element 12, and outputs the second control signal CONT2 to the control terminal of the third switching element 13 and to the control terminal of the fourth switching element 14.

In the present embodiment, the first control signal CONT1 is a signal which may take a first voltage level L and a second voltage level H higher than the first voltage level L. When the first control signal CONT1 is the first voltage level L, the first switching element 11 which is the P-type MOS transistor is turned ON, while the second switching element 12 which is the N-type MOS transistor is turned OFF. On the other hand, when the first control signal CONT1 is the second voltage level H, the first switching element 11 is turned OFF, while the second switching element 12 is turned ON. In response to the first control signal CONT1, the first and second switching elements 11 and 12 are exclusively turned ON. The first switching element 11 is turned ON and the second switching element 12 is turned OFF (the first control signal CONT1 becomes the first voltage level L), so that the one end 5A of the induction load 5 is connected to the first power supply unit 3. The first switching element 11 is turned OFF and the second switching element 12 is turned ON (the first control signal CONT1 becomes the second voltage level H), so that the one end 5A of the induction load 5 is connected to the second power supply unit 4.

Likewise, the second control signal CONT2 is a signal which may take the first voltage level L and the second voltage level H higher than the first voltage level L. When the second control signal CONT2 is the first voltage level L, the third switching element 13 which is the P-type MOS transistor is turned ON, while the fourth switching element 14 which is the N-type MOS transistor is turned OFF. On the other hand, when the second control signal CONT2 is the second voltage level H, the third switching element 13 is turned OFF, while the fourth switching element 14 is turned ON. In response to the second control signal CONT2, the third and fourth switching elements 13 and 14 are exclusively turned ON. The third switching element 13 is turned ON and the fourth switching element 14 is turned OFF (the second control signal CONT2 becomes the first voltage level L), so that the other end 5b of the induction load 5 is connected to the first power supply unit 3. The third switching element 13 is turned OFF and the fourth switching element 14 is turned ON (the second control signal CONT2 becomes the second voltage level H), so that the other end 5B of the induction load 5 is connected to the second power supply unit 4.

In the H-bridge circuit 10, when the first switching element 11 and the fourth switching element 14 are turned ON and the second switching element 12 and the third switching element 13 are turned OFF, a current flows through the power supply unit 3, the first switching element 11, the induction load 5, the fourth switching element 14 and the second power supply unit 4 in this order. As a result, a bias state is formed in which a conducting current flows through the induction load 5 in the first direction, and an amount of the conducting current flowing through the induction load 5 increases with a passage of time. In the bias state, when the first switching element 11 is turned OFF and the second switching element 12 is turned ON, a back-flow state is formed in which a current flows back within a loop including the second switching element 12, the induction load 5 and the fourth switching element 14. In the back-flow state, the conducting current flowing through the induction load 5 maintains the same direction (first direction) as the direction of the bias state and the amount of the conducting current flowing through the induction load 5 decreases with a passage of time.

Likewise, in the H-bridge circuit 10, when the second switching element 12 and the third switching element 13 are turned ON, and the first switching element 11 and the fourth switching element 14 is turned OFF, a current flows through the first power supply unit 3, the third switching element 13, the induction load 5, the second switching element 12 and the second power supply unit 4 in this order. As a result, a bias state is formed in which a conducting current flows through the induction load 5 in the second direction, and an amount of the conducting current flowing through the induction load 5 increases with a passage of time. In the bias state, when the third switching element 13 is turned OFF and the fourth switching element 14 is turned ON, a back-flow state is formed in which a current flows back within a loop including the second switching element 12, the induction load 5 and the fourth switching element 14. In the back-flow state, the conducting current flowing through the induction load 5 maintains the same direction (second direction) as the direction of the bias state and the amount of the conducting current flowing through the induction load decreases with a passage of time.

As described above, when the voltage level of the first control signal CONT 1 is the first voltage level L and the voltage level of the second control signal CONT2 is the second voltage level H, the bias state is formed in which the conducting current flows through the induction load 5 in the first direction, and in the bias state of the first direction, switching is performed such that both of the voltage level of the first control signal CONT1 and the voltage level of the second control signal CONT2 become the second voltage level H, so that the back-flow state in formed in which the conducting current flows through the induction load 5 in the first direction. On the other hand, when the voltage level of the first control signal CONT 1 is the second voltage level H and the voltage level of the second control signal CONT2 is the first voltage level L, the bias state is formed in which the conducting current flows through the induction load 5 in the second direction, and in the bias state of the second direction, switching is performed such that both of the voltage level of the first control signal CONT1 and the voltage level of the second control signal CONT2 become the second voltage level H, so that the back-flow state is formed in which the conducting current flows through the induction load 5 in the second direction.

The control signal generating circuit 20 is configured to exclusively turn ON the two switching elements connected to the one end 5A or the other end 5B of the induction load 5 in which the control signal is not fixed, to increase the conducting current after a passage of a first predetermined delay time T1 after the conducting current becomes less than a preset reference value REF of the conducting current when the conducting current becomes less than the reference value REF. Also, the control signal generating circuit 20 is configured to exclusively turn ON the two switching elements connected to the one end 5A or the other end 5B of the induction load 5 in which the control signal is not fixed to decrease the conducting current after a passage of a second predetermined delay time T2 after the conducting current becomes equal to or greater than the preset reference value REF of the conducting current when the conducting current becomes equal to or greater than the reference value REF.

To this end, the control signal generating circuit 20 is configured to detect a voltage value (first current detection value VOUT1, second current detection value VOUT2) based on the conducting current flowing through the induction load 5 for each of the first direction and the second direction. When the direction command signal DIR indicates the first direction, the control signal generating circuit 20 outputs as the second control signal CONT2 a signal for causing the other end 5B of the induction load 5 to be connected to the second power supply unit 4 (turning OFF the third switching element 13 and turning ON the fourth switching element 14). In addition, the control signal generating circuit 20 detects the first current detection value VOUT1 and compares the first current detection value VOUT1 to the reference value (command voltage REF as will be described later) of the conducting current. When the first current detection value VOUT1 becomes less than the reference value REF of the conducting current, the control signal generating circuit 20 outputs as the first control signal CONT1 a signal for causing the one end 5A of the induction load 5 to be connected to the first power supply unit 3 (turning ON the first switching element 11 and turning OFF the second switching element 12) after a passage of the first predetermined delay time T1 after the first current detection value VOUT1 becomes less than the preset reference value REF of the conducting current. On the other hand, when the first current detection value VOUT1 becomes equal to or greater than the reference value REF, the control signal generating circuit 20 outputs as the first control signal CONT1 a signal for causing the one end 5A of the induction load 5 to be connected to the second power supply unit 4 (turning ON the second switching element 12 and turning OFF the first switching element 11) after a passage of the second predetermined delay time T2 after the first current detection value VOUT1 becomes equal to or greater than the preset reference value REF of the conducting current.

That is, when the direction command signal DIR indicates the first direction, the control signal generating circuit 20 turns OFF the third switching element 13, turns ON the fourth switching element 14, and in this state switches ON/OFF of the first switching element 11 and ON/OFF of the second switching element 12 according to the conducting current flowing through the induction load 5 detected as the first current detection value VOUT1. Thereby, switching between the bias state of the first direction (first switching element 11 is ON and the second switching element 12 is OFF) and the back-flow state of the first direction (first switching element 11 is OFF and the second switching element 12 is ON) is performed.

When ON/OFF of the first switching element 11 and ON/OFF of the second switching element 12 are switched according to the first current detection value VOUT1, a conducting current waveform may oscillate if the switching is performed as soon as the conducting current becomes equal to or greater than the reference value REF or becomes less than the reference value REF. To avoid this, in the present embodiment, the control signal generating circuit 20 turns ON the first switching element 11 and turns OFF the second switching element 12 after a passage of the first predetermined delay time T1 after the first current detection value VOUT1 becomes less than the preset reference value REF of the conducting current in the back-flow state of the first direction. Thus, switching is performed (shifting to the bias state occurs) such that the conducting current undershoots the reference value REF for the first delay time T1 and then increases. Likewise, the control signal generating circuit 20 turns ON the second switching element 12 and turns OFF the first switching element 11 after a passage of the second predetermined delay time T2 after the first current detection value VOUT1 becomes equal to or greater than the preset reference value REF of the conducting current in the bias state of the first direction. Thus, switching is performed (shifting to the back-flow state occurs) such that the conducting current overshoots the reference value REF for the second delay time T2 and then decreases.

Likewise, when the direction command signal DIR indicates the second direction, the control signal generating circuit 20 outputs as the first control signal CONT1 a signal for causing the one end 5A of the induction load 5 to be connected to the second power supply unit 4 (turning OFF the first switching element 11 and turning ON the second switching element 12). In addition, the control signal generating circuit 20 detects the second current detection value VOUT2 and compares the second current detection value VOUT2 to the reference value REF of the conducting current. When the second current detection value VOUT2 becomes less than the reference value REF of the conducting current, the control signal generating circuit 20 outputs as the second control signal CONT2 a signal for causing the other end 5B of the induction load 5 to be connected to the first power supply unit 3 (turning ON the third switching element 13 and turning OFF the fourth switching element 14) after a passage of the first predetermined delay time T1 after the second current detection value VOUT2 becomes less than the preset reference value REF of the conducting current. On the other hand, when the second current detection value VOUT2 becomes equal to or greater than the reference value REF of the conducting current, the control signal generating circuit 20 outputs as the second control signal CONT2 a signal for causing the other end 5B of the induction load 5 to be connected to the second power supply unit 4 (turning ON the fourth switching element 14 and turning OFF the third switching element 13) after a passage of the second predetermined delay time T2 after the second current detection value VOUT2 becomes equal to or greater than the reference value REF of the conducting current.

That is, when the direction command signal DIR indicates the second direction, the control signal generating circuit 20 turns OFF the first switching element 11, turns ON the second switching element 12, and in this state, switches ON/OFF of the third switching element 13 and ON/OFF of the fourth switching element 14 according to the conducting current flowing through the induction load 5 detected as the second current detection value VOUT2. Thereby, switching between the bias state of the second direction (third switching element 13 is ON and the fourth switching element 14 is OFF) and the back-flow state of the second direction (third switching element 13 is OFF and the fourth switching element 14 is ON) is performed.

When ON/OFF of the third switching element 13 and ON/OFF the fourth switching element 14 is switched according to the second current detection value VOUT2, to prevent oscillation of the conducting current waveform, the control signal generating circuit 20 turns ON the third switching element 13 and turns OFF the fourth switching element 14 after a passage of the first predetermined delay time T1 after the second current detection value VOUT2 becomes less than the reference value REF of the conducting current in the back-flow state of the second direction. Thus, switching is performed (shifting to the bias state occurs) such that the conducting current undershoots the reference value REF for the first delay time T1 and then increases. Likewise, the control signal generating circuit 20 turns ON the fourth switching element 12 and turns OFF the third switching element 13 after a passage of the second predetermined delay time T2 after the second current detection value VOUT2 becomes equal to or greater than the reference value REF of the conducting current in the bias state of the second direction. Thus, switching is performed (shifting to the back-flow state occurs) such that the conducting current overshoots the reference value REF for the second delay time T2 and then decreases.

In accordance with the above configuration, in the case where switching of the H-bridge circuit 10 is performed such that the conducting current flowing through the induction load 5 decreases with a passage of time in a state in which both ends of the induction load 5 are connected to the second power supply unit 4 (back-flow state), the conducting current is compared to the reference value REF. Then, when it is determined that the conducting current is less than the reference value REF of the conducting current, switching of the H-bridge circuit 10 is performed to increase the conducting current flowing through the induction load 5 after a passage of the first predetermined delay time T1 after it is determined that the conducting current is less than the reference value REF. Or, in the case where switching of the H-bridge circuit 10 is performed such that the conducting current flowing through the induction load 5 increases with a passage of time in a state in which both ends of the induction load 5 are connected to the first power supply unit 3 and to the second power supply unit 4 (bias state), the conducting current is compared to the reference value REF of the conducting current. Then, when it is determined that the conducting current is equal to or greater than the reference value REF of the conducting current, switching of the H-bridge circuit 10 is performed to decrease the conducting current flowing through the induction load 5 after a passage of the second predetermined delay time T2 after it is determined that the conducting current becomes equal to or greater than the reference value REF.

As described above, since the ON-operation and the OFF-operation of the H-bridge circuit 10 are performed according to the conducting current flowing through the induction load 5, a current ripple can be reduced irrespective of a time constant of the induction load 5. This makes it possible to reduce a magnitude of the ripple of the current flowing through the induction load 5 in a wide range from a minute current to a saturation current. Especially in the case where a small-sized stepping motor incorporated into an optical disc device is actuated by a micro-step driving, non-uniformity of an average current between different phases in the stepping motor is lessened. As a result, position control (stop control) of a driven unit such as a recording head actuated by the stepping motor can be performed with high accuracy, and smooth rotation at a low speed can be realized.

It is not necessary to use a carrier frequency, and a circuit configuration becomes more simple. In addition, the fixed signal is generated to connect the second power supply unit 4 in which its voltage is the reference voltage to one of the one end 5A and the other end 5B of the induction load 5 according to the direction in which the conducting current flows, and the control signal is generated to connect the other of the one end 5A and the other end 5B of the induction load 5 to one of the first power supply unit 3 and the second power supply unit 4, based on the value based on the conducting current flowing through the induction load 5. Therefore, it is possible to easily generate the control signal for performing the ON-operation and the OFF-operation of the H-bridge circuit 10 according to the conducting current flowing through the induction load 5. As a result, the number of components in an integrated circuit and on a circuit board can be reduced, and an inexpensive induction load driving system can be provided.

Hereinafter, a configuration of the control signal generating circuit 20 will be described more specifically. Turning back to FIG. 1 again, the control signal generating circuit 20 includes a comparison unit 21 which compares the first current detection value VOUT1 or the second current detection value VOUT2 to the reference value REF of the conducting current and outputs a first comparison signal COMP1 or a second comparison signal COMP2 according to the direction command signal DIR, and a delay unit 22 which generates the first control signal CONT1 such that it delays for the first delay time T1 a state change (state change from the second voltage level H to the first voltage level H) in the first comparison signal COMP1 at a time point when the first current detection value VOUT1 becomes less than the reference value REF of the conducting current and it delays for the second delay time T2 the state change in first comparison signal COMP1 at a time point when the first current detection value VOUT1 becomes equal to or greater than the reference value REF of the conducting current, and generates the second control signal CONT2 such that it delays for the first delay time T1 a state change (state change from the first voltage level L to the second voltage level H) in the second comparison signal COMP2 at a time point when the second current detection value VOUT2 becomes less than the reference value REF of the conducting current and it delays for the second delay time T2 the state change in second comparison signal COMP2 at a time point when the second current detection value VOUT2 becomes equal to or greater than the reference value REF of the conducting current. Furthermore, the control signal generating circuit 20 includes a command voltage generating unit 23 which converts the current command value TQ from outside into a voltage (command voltage) which is a reference voltage of a reference power supply unit (ground) 6 and outputs the reference REF of the conducting current.

The command voltage generating unit 23 sets a product (voltage value) of the current value indicated by the current command value TQ and of the corresponding detection resistance value (ON-resistance value of the switching element) as the reference value REF. Note that the current command value TQ may be an analog signal or a digital signal. In the present embodiment, the detection resistance changes depending on the direction of the conducting current. Specifically, in the first direction, the ON-resistance of the fourth switching element 14 becomes the detection resistance, while in the second direction, the ON-resistance of the second switching element 12 becomes the detection resistance. This may cause a difference in ON-resistance value between the second switching element 12 and the fourth switching element 14. Accordingly, in a case where such a difference is non-negligible, the command voltage generating unit 23 may be provided with a function for making compensation for the reference value REF according to the direction of the conducting current, or a plurality of separate command voltage generating units may be provided.

In the present embodiment, the first current detection value VOUT1 is a voltage applied to the fourth switching element 14 connected to the second power supply unit 4 in which its voltage is a reference voltage (ground voltage) for setting a command voltage, of the first switching element 11 and the fourth switching element 14, and is on the basis of the reference voltage (ground voltage). In other words, the first current detection value VOUT1 is a voltage between the third switching element 13 and the fourth switching element 14 on the basis of the voltage of the second power supply unit 4. When the conducting current flows in the first direction, a current flows through the fourth switching element 14 in the bias state and in the back-flow state. That is, a product of a value of the conducting current and a value of the ON-resistance of the fourth switching element 14 through which the conducting current flows becomes the first current detection value VOUT1. By researching the ON-resistance of the fourth switching element 14 in advance and detecting the first current detection value VOUT1 in the case where the conducting current flows through the induction load 5 in the first direction, the conducting current flowing through the induction load 5 can be detected properly.

The second current detection value VOUT2 is a voltage applied to the second switching element 12 connected to the second power supply unit 4 in which its voltage is the reference voltage (ground voltage), of the second switching element 12 and the third switching element 13, and is on the basis of the reference voltage (ground voltage). In other words, the second current detection value VOUT2 is a voltage between the first switching element 11 and the second switching element 12 on the basis of the voltage of the second power supply unit 4. When the conducting current flows in the second direction, a current flows through the second switching element 12 in the bias state and in the back-flow state. That is, a product of a value of the conducting current and a value of the ON-resistance of the second switching element 12 through which the conducting current flows becomes the second current detection value VOUT2. By researching the ON-resistance of the second switching element 12 in advance and detecting the second current detection value VOUT2 in the case where the conducting current flows in the induction load 5 in the second direction, the conducting current flowing through the induction load 5 can be detected properly.

By researching the ON-resistance of the second switching element 12 and the ON-resistance of the fourth switching element 14 in advance by, for example, predicting them from sizes of these switching elements 12 and 14, the conducting current flowing through the induction load 5 can be detected easily. This makes it possible to effectively detect the conducting current in the bias state and in the back-flow state, without providing surplus detection resistor in the H-bridge circuit 10.

Since the fourth switch element 14 is ON in the bias state and in the back-flow state in the case where the current flows through the induction load 5 in the first direction, a voltage at an end of the fourth switching element 14 which is connected to the induction load 5 is higher than the voltage of the second power supply unit 4. Therefore, the control signal generating circuit 20 detects this voltage as the first current detection value VOUT1, and controls switching based on the first current detection value VOUT1, thereby controlling the conducting current flowing through the induction load 5 in the first direction. Likewise, since the second switch element 12 is ON in the bias state and in the back-flow state in the case where the current flows through the induction load 5 in the second direction, a voltage at an end of the second switching element 12 which is connected to the induction load 5 is higher than the voltage of the second power supply unit 4. Therefore, the control signal generating circuit 20 detects this voltage as the second current detection value VOUT2, and controls switching based on the second current detection value VOUT2, thereby controlling the conducting current flowing through the induction load 5 in the second direction.

Figure 2:
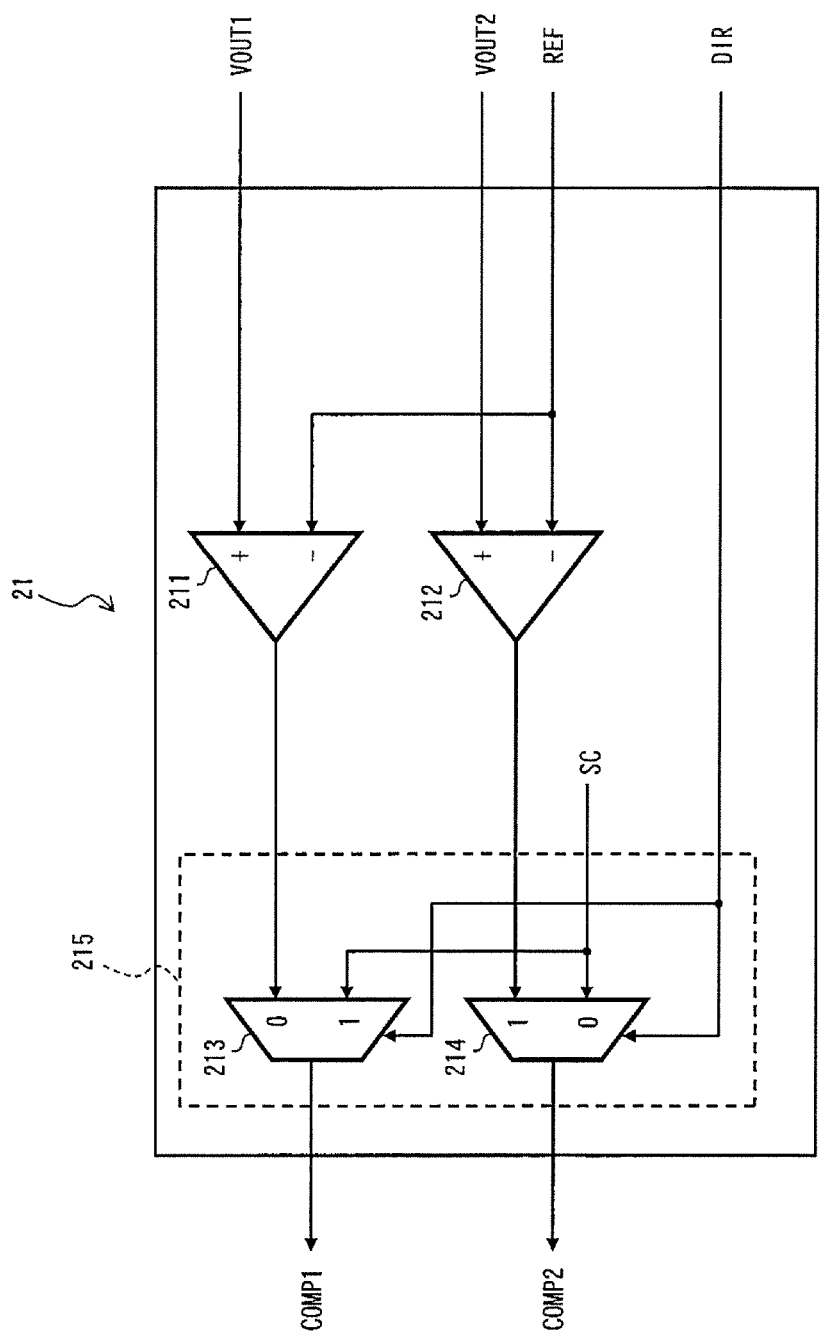
FIG. 2 is a circuit diagram showing a schematic configuration of a comparison unit in the induction load driving system of FIG. 1.

FIG. 2 is a circuit diagram showing a schematic configuration of the comparison unit 21 in the induction load driving system of FIG. 1. Referring to FIG. 2, the comparison unit 21 of the present embodiment includes a first comparator 211 for comparing the first current detection value VOUT1 to the reference value REF of the conducting current, and a second comparator 212 for comparing the second current detection value VOUT2 to the reference value REF of the conducting current. Further, the comparison unit 21 includes a first multiplexer circuit 213 which receives as inputs an output signal of the first comparator 211 and a fixed signal SC fixed in a predetermined voltage level (second voltage level H higher than the first voltage level L), selects the output signal of the first comparator 211 or the fixed signal SC and outputs the first comparison signal COMP1, according to the direction command signal DIR, and a second multiplexer circuit 214 which receives as inputs an output signal of the second comparator 212 and the fixed signal SC fixed in the predetermined voltage level (second voltage level H), selects the output signal of the second comparator 212 or the fixed signal SC and outputs the second comparison signal COMP2, according to the direction command signal DIR.

The first multiplexer circuit 213 and the second multiplexer circuit 214 constitute a signal selection unit 215. Specifically, when the direction command signal DIR indicates the first direction, and the first current detection value VOUT1 is equal to or greater than the reference value REF of the conducting current based on the output of the first comparator 211, the signal selection unit 215 outputs as the first comparison signal COMP1 a signal for causing the one end 5A of the induction load 5 to be connected to the second power supply unit 4. On the other hand, when the direction command signal DIR indicates the first direction, and the first current detection value VOUT1 is less than the reference value REF of the conducting current based on the output of the first comparator 211, the signal selection unit 215 outputs as the first comparison signal COMP1 a signal for causing the one end 5A of the induction load 5 to be connected to the first power supply unit 3. In these cases, in addition to the above first comparison signal COMP1, the signal selection unit 215 outputs as the second comparison signal COMP2 the fixed signal SC for causing the other end 5B of the induction load 5 to be connected to the second power supply unit 4.

When the direction command signal DIR indicates the second direction, the signal selection unit 215 outputs as the first comparison signal COMP1 the fixed signal SC for causing the one end 5A of the induction load 5 to be connected to the second power supply unit 4. In addition to the first comparison signal COMP1, when the second current detection value VOUT2 is equal to or greater than the reference value REF of the conducting current based on the output of the second comparator 212, the signal selection unit 215 outputs as a second comparison signal COMP2 a signal for causing the other end 5B of the induction load 5 to be connected to the second power supply unit 4. On the other hand, when the second current detection value VOUT2 is less than the reference value REF based on the output of the second comparator 212, the signal selection unit 215 outputs as the second comparison signal COMP2 a signal for causing the other end 5B of the induction load 5 to be connected to the first power supply unit 3.

In the above configuration, when the conducting current flows through the induction load 5 in the same direction, switching is performed for the two switching elements which are exclusively turned ON in response to one control signal, among the four switching elements 11, 12, 13, and 14 constituting the H-bridge circuit 10. Thus, switching between the bias state and the back-flow state can be implemented easily.

As used herein, the phrase "exclusively turned ON" means that only either one of the associated two switching elements may be turned ON, and does not mean to exclude a case where these two switching elements are turned OFF, for example, a dead time is provided as will be described later.

Figure 3A:
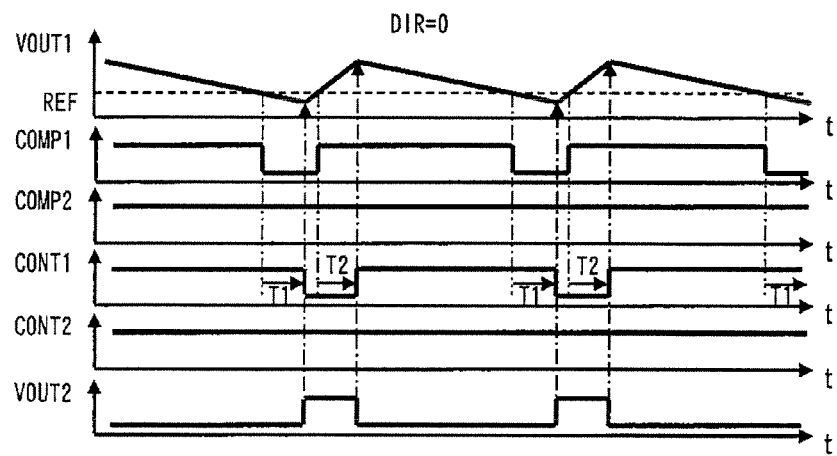
FIGS. 3A to 3C is a view showing waveforms of signals in a case where a direction command signal DIR is a first direction in the induction load driving system of FIG. 1.
Figure 3B:
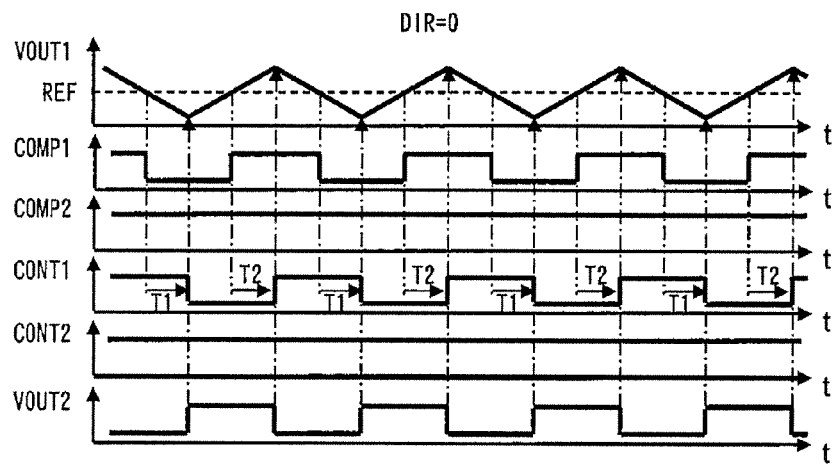
Figure 3C:
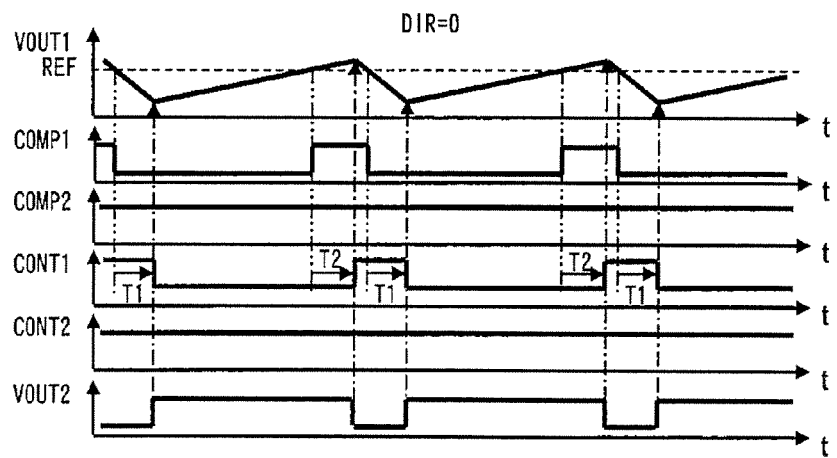
Figure 4A:
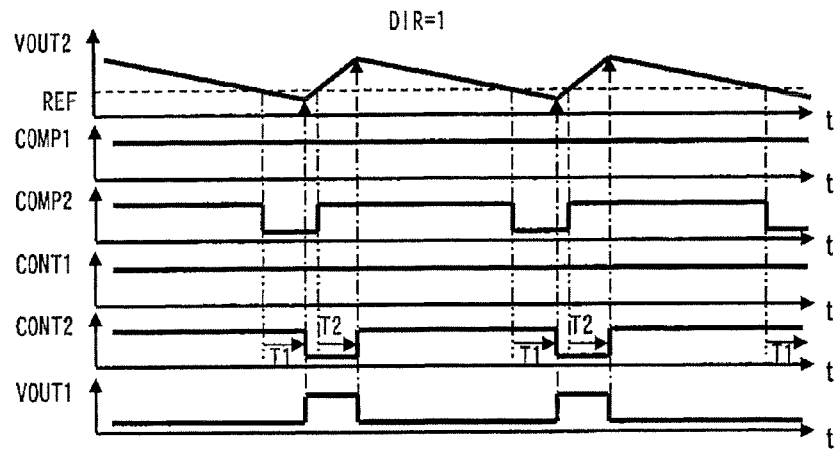
FIGS. 4A to 4C is a view showing waveforms of signals in a case where the direction command signal DIR is a second direction in the induction load driving system of FIG. 1.
Figure 4B:
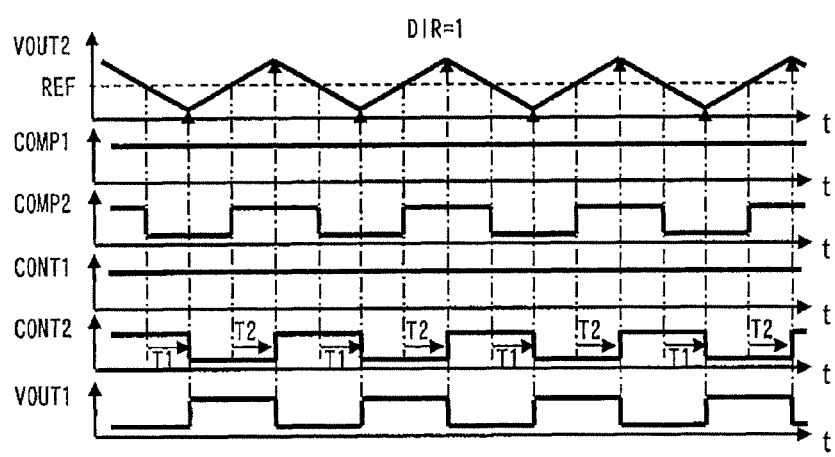
Figure 4C:
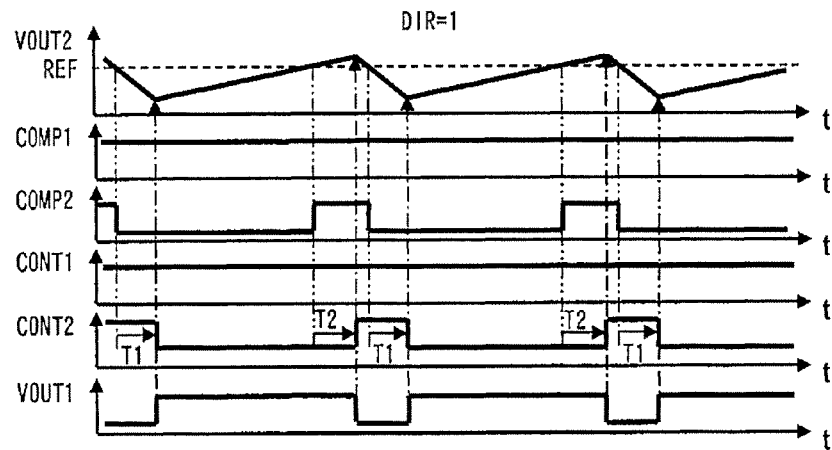

FIGS. 3A to 3C and 4A to 4C are views showing signal waveforms in the induction load driving system of FIG. 1. FIGS. 3A to 3C is a view showing the signal waveforms in a case where the direction command signal DIR is the first direction. FIGS. 4A to 4C is a view showing the signal waveforms in a case where the direction command signal DIR is the second direction.

FIGS. 3A and 4A each shows the signal waveforms in the case where the reference value REF of the conducting current is a minute current smaller than a value of a half of a saturation current of the induction load 5. FIGS. 3B and 4B each shows the signal waveforms in the case where the reference value REF of the conducting current is equal to the value of the half of the saturation current of the induction load 5. FIGS. 3C and 4C each shows the signal waveforms in the case where the reference value REF of the conducting current is greater than the value of the half of the saturation current of the induction load 5.

As shown in FIGS. 2, 3A to 3C and 4A to 4C, in the comparison unit 21 of the present embodiment, the first current detection value VOUT1 and the second current detection value VOUT2 are input to a non-inverting input terminal of the first comparator 211 and to a non-inverting input terminal of the second comparator 212, respectively, and the reference value REF of the conducting current is input to an inverting input terminal of the first comparator 211 and to an inverting input terminal of the second comparator 212. When first current detection value VOUT1 is less than the reference value REF of the conducting current, the first comparator 211 outputs the first voltage level L, while when the first current detection value VOUT1 is equal to or greater than the reference value REF of the conducting current, the first comparator 211 outputs the second voltage level H higher than the first voltage level H.

Likewise, when the second current detection value VOUT2 is less than the reference value REF of the conducting current, the second comparator 212 outputs a first voltage level L, while when the second current detection value VOUT2 is equal to or greater than the reference value REF of the conducting current, the second comparator 212 outputs a second voltage level H higher than the first voltage level H. The first multiplexer circuit 213 has input terminals of "0" and "1". The output signal of the first comparator 211 is input to the input terminal "0", while the fixed signal SC which is always in the second voltage level H is input to the input terminal "1". Likewise, the second multiplexer circuit 214 has input terminals of "0" and "1". The output signal of the second comparator 212 is input to the input terminal "1", while the fixed signal SC which is always in the second voltage level H is input to the input terminal "0".

The direction command signal DIR determining the signal to be output from the first multiplexer circuit 213 and the signal to be output from the second multiplexer circuit 214 are input to the first multiplexer circuit 213 and to the second multiplexer circuit 214. The direction command signal DIR is adapted to take a binary value of "0" or "1". The value "0" of the direction command signal DIR defines that the current flows through the induction load 5 in the first direction, while the value "1" of the direction command signal DIR defines that the current flows through the induction load 5 in the second direction. Each of the first and second multiplexer circuits 213 and 214 outputs the signal input to the input terminal "0" or "1" corresponding to the value "0" or "1" indicated by the direction command signal DIR.

For example, when the direction command signal DIR is the value "0" indicating the first direction, the first multiplexer circuit 213 outputs the output signal of the first comparator 211 which is input to the input terminal "0", and the second multiplexer circuit 214 outputs the fixed signal SC input to the input terminal "0". When the direction command signal DIR is the value "1" indicating the second direction, the first multiplexer circuit 213 outputs the fixed signal SC input to the input terminal "1", and the second multiplexer circuit 214 outputs the output signal of the second comparator 212 which is input to the input terminal "1". In this way, the signal output from the first multiplexer circuit 213 is output as the first comparison signal COMP1, while the signal output from the second multiplexer circuit 214 is output as the second comparison signal COMP2.

For example, as shown in FIGS. 3A to 3C, when the direction command signal DIR is the value "0" indicating the first direction, the first comparison signal COMP1 is a signal waveform according to a result of a comparison between the first current detection value VOUT1 and the reference value REF of the conducting current, while the second comparison signal COMP2 is a signal waveform fixed in the second voltage level H. As shown in FIGS. 4A to 4C, when the direction command signal DIR is the value "1" indicating the second direction, the first comparison signal COMP1 is a signal waveform fixed in the second voltage level H, while the second comparison signal COMP2 is a signal waveform according to a result of a comparison between the second current detection value VOUT2 and the reference value REF of the conducting current.

The first comparison signal COMP1 and the second comparison signal COMP2 are input to the delay unit 22. The delay unit 22 outputs a signal derived by delaying a timing of a state change in the first comparison signal COMP1 or the second comparison signal COMP2 for the first delay time T1 or for the second delay time T2.

Hereinafter, specific description will be given. The case where the direction command signal DIR is the value "0" indicating the first direction, will be described with reference to FIGS. 3A to 3C. In this case, as shown in FIGS. 3A to 3C, the delay unit 22 outputs as a first control signal CONT1 a signal derived by delaying a timing of a state change in the first comparison signal COMP1 whose state is changeable. In this state, the second comparison signal COMP2 is the fixed signal SC whose state does not change. Therefore, the delay unit 22 outputs as a second control signal CONT2 a signal having the same waveform as that of the second comparison signal COMP2.

With reference to FIG. 3A, the signal waveforms and the corresponding operation of the H-bridge circuit will be described. When the first current detection value VOUT1 is equal to or greater than the reference value REF of the conducting current, the output of the first comparison signal COMP1 is the second voltage level H. Therefore, the first control signal CONT1 is the second voltage level H, and the second control signal CONT2 is the second voltage level H based on the fixed signal SC, so that the second switching element 12 and the fourth switching element 14 are turned ON, and the first switching element 11 and the third switching element 13 are turned OFF, which state is the back-flow state of the first direction. In this state, since no current is supplied from the first power supply unit 3, a current flowing through the induction load 5 decreases with a passage of time. Therefore, the first current detection value VOUT1 decreases with a passage of time.

When the first current detection value VOUT1 becomes less than the reference value REF of the conducting current, the first comparison signal COMP1 changes from the second voltage level H to the first voltage level L. However, the first control signal CONT1 changes from the second voltage level H to the first voltage level L after a passage of the first delay time T1 after the beginning of the state change in the first comparison signal COMP1 from the second voltage level H to the first voltage level L. Because of this, the first control signal CONT1 holds the second voltage level H for the first delay time T1 after the begging of the state change in the first comparison signal COMP1. Therefore, the back-flow state of the first direction continues even when the first current detection value VOUT1 is less than the reference value REF of the conducting current, and the first current detection value VOUT1 undershoots the reference value REF of the conducting current.

After a passage of the first delay time T1 after the begging of the state change in the first comparison signal COMP1 from the second voltage level H to the first voltage level L, the first control signal CONT1 changes from the second voltage level H to the first voltage level L. Thereby, the first switching element 11 is switched from OFF to ON, and the second switching element 12 is switched from ON to OFF. Thus, the back-flow state of the first direction shifts to the bias state of the first direction. In this state, the first power supply unit 3 supplies a current to the induction load 5, and the current flowing through the induction load 5 increases with a passage of time, so that the first current detection value VOUT1 increases with a passage of time.

Thereafter, when the value of the first current detection value VOUT1 becomes equal to or greater than the reference value REF of the conducting current, the first comparison signal COMP1 changes from the first voltage level L to the second voltage level H. However, the first control signal CONT1 changes from the first voltage level L to the second voltage level H after a passage of the second delay time T2 after the begging of the state change in the first comparison signal COMP1 from the first voltage level L to the second voltage level H. Because of this, the first control signal CONT1 holds the first voltage level L for the second delay time T2 after the begging of the state change in the first comparison signal COMP1. Therefore, the bias state of the first direction continues even when the first current detection value VOUT1 becomes greater than the reference value REF of the conducting current, and the first current detection value VOUT1 overshoots the reference value REF of the conducting current.

After a passage of the second delay time T2 after the begging of the state change in the first comparison signal COMP1, the first control signal CONT1 changes from the first voltage level L to the second voltage level H. Thereby, the first switching element 11 is switched from ON to OFF, and the second switching element 12 is switched from OFF to ON. Thus, the bias state of the first direction shifts to the back-flow state of the first direction. After that, so long as the direction command signal DIR does not change, the switching operation of the first switching element 11 and the switching operation of the second switching element 12 are repeated. The waveform of the first current detection value VOUT1 in this operation is the waveform of the conducting current flowing through the induction load 5.

Each of the first delay time T1 and the second delay time T2 is set to a time which is about 1/several-tens to 1/several-thousands with respect to a time constant determined based on an inductance and resistance component of the induction load 5 and ON-resistance of the switching element. This setting can effectively suppress a ripple magnitude of the conducting current irrespective of the reference value REF (current command value TQ) of the conducting current.

When the first and second switching elements 11 and 12 are exclusively turned ON in response to the first control signal CONT1, there may be set a time period (dead time) for which both of the switching elements 11 and 12 are OFF for switching of the first and second switching elements 11 and 12 to surely inhibit a state in which the both of the first and second switching elements 11 and 12 are turned ON at the same time. Specifically, this can be implemented by providing a second delay unit (e.g., delay element, a delay circuit, etc.,) between a dividing point at which the first control signal CONT1 is divided into portions directed to the first switching element 11 and the second switching element 12, and the first switching element 11 or the second switching element 12. This delay unit is different from the delay unit 22 in that the delay unit 22 delays divided portions of the first control signal CONT1 which are input to both the first switching element 11 and the second switching element 12, whereas the second delay unit delays only the first control signal CONT1 input to only either the first switching element 11 or the second switching element 12. Likewise, for switching of the third and fourth switching elements 13 and 14, there may be set a time period (dead time) for which both of the third and fourth switching elements 13 and 14 are OFF.

As can be seen from FIGS. 3A to 3C, state changes in the signals with respect to a change in the reference value REF of the conducting current are similar. Note that a change amount (i.e., slope of the first current detection value VOUT1) of the conducting current flowing through the induction load 5, per unit time, changes according to a time constant determined by the ON-resistance of the switching element in ON-state and the inductance and resistance component of the induction load 5. For example, as shown in FIG. 3B, when the value of the half of the saturation current of the induction load 5 is the reference value REF of the conducting current, and the reference value REF of the conducting current is set so that a current of the value of the half of the saturation current of the induction load 5 flows through the induction load 5, a change amount (increase amount) of the conducting current in the bias state per unit time is substantially equal to a change amount (decrease amount) of the conducting current in the back-flow state per unit time. As shown in FIG. 3A, when the value which is smaller than the value of the half of the saturation current of the induction load 5 is the reference value REF of the conducting current, a change amount (increase amount) of the conducting current in the bias state per unit time is greater than a change amount (decrease amount) of the conducting current in the back-flow state per unit time. Thus, a ratio (duty ratio) in which the first control signal CONT1 is the second voltage level H is greater than that in the example of FIG. 3B. As shown in FIG. 3C, when the value which is greater than the value of the half of the saturation current of the induction load 5 is the reference value REF of the conducting current, a change amount (decrease amount) of the conducting current in the back-flow state per unit time is greater than a change amount (increase amount) of the conducting current in the bias state per unit time. Thus, a ratio (duty ratio) in which the first control signal CONT1 is the second voltage level H is less than that in the example of FIG. 3B.

In the present embodiment, as shown in FIGS. 3A to 3C, the first delay time T1 and the second delay time T2 are set to an equal time. Therefore, as shown in FIG. 3A, in the case where the value which is smaller than the value of the half of the saturation current of the induction load 5 is the reference value REF of the conducting current, an amount of overshooting of the conducting current from the reference value REF in the bias state is greater than an amount of undershooting of the conducting current from the reference value REF in the back-flow state. As shown in FIG. 3C, in the case where the value which is greater than the value of half of the saturation current of the induction load 5 is the reference value REF of the conducting current, an amount of undershooting of the conducting current from the reference value REF in the back-flow state is greater than an amount of overshooting of the conducting current from the reference value REF in the bias state. As shown in FIG. 3B, in the case where the value which is equal to the value of the half of the saturation current of the induction load 5 is the reference value REF of the conducting current, an amount of undershooting is equal to an amount of overshooting, and a cycle of the conducting current, switching between the bias state and back-flow state is shorter than those in another examples.

For example, the delay unit 22 may be configured to be capable of changing each of the first delay time T1 and the second delay time T2. For example, the delay unit 22 may be constituted by a circuit such as a D flip flop circuit, which switches an output in response to a predetermined clock signal, and may be configured to change a frequency of the clock signal. Thus, the delay unit 22 changes the frequency of the clock signal according to the time constant determined by the induction load 5 and the switching element and/or the current command value TQ (reference value REF of the conducting current), thereby changing the first delay time T1 and the second delay time T2 respectively.

In a case where the current command value TQ is decided in advance, the first delay time T1 and the second delay time T2 may be set to different times. For example, the delay unit 22 may include a first delay element for delaying an input signal for the first delay time T1, a second delay element for delaying an input signal for the second delay time T2, and a switch for causing the first comparison signal COMP1 or the second comparison signal COMP2 to be input to the first delay element or to the second delay element. And, the first comparison signal COMP1 or the second comparison signal COMP2 may be input to the first delay element when the first current detection value VOUT1 or the second current detection value VOUT2 is equal to or greater than the reference value REF of the conducting current, and the first comparison signal COMP1 or the second comparison signal COMP2 may be input to the second delay element when the first current detection value VOUT1 or the second current detection value VOUT2 is less than the reference value REF of the conducting current. Thus, by making a delay component of the first delay element and a delay component of the second delay element different from each other, and thus, the first delay time T1 and the second delay time T2 can be made different from each other.

As described above, in the case where a relationship between the saturation current and the reference value (command value) REF of the conducting current is known in advance, the first delay time T1 or the second delay time T2 is adjusted based on the reference value REF of the conducting current. Thus, it is possible to properly adjust an output waveform of the conducting current.

Specifically, in the case where the reference value REF of the conducting current is a minute current as shown in FIG. 3A (the same occurs in the case where the reference value REF of the conducting current is less than the value of the half of the saturation current), if a delay time (second delay time T2) in the bias state is set shorter than a delay time (first delay time T1) in the back-flow state (T1>T2), an amount of overshooting in the bias state is suppressed, and a current ripple is suppressed effectively.

In the case where the reference value REF of the conducting current is closer to the saturation current as shown in FIG. 3C (the same occurs in the case where the reference value REF of the conducting current is equal to or greater than the value of the half of the saturation current), if a delay time (first delay time T1) in the back-flow state is set shorter than a delay time (second delay time T2) in the bias state (T1≤T2), an amount of undershooting in the back-flow state is suppressed, and a current ripple is suppressed effectively.

If the amount of undershooting and the amount of overshooting are suppressed excessively, then a switching cycle becomes short, the conducting current oscillates, and a value of the conducting current is not stable, in some cases. Therefore, the delay time T1 and the delay time T2 are set in view of stability of the value of the conducting current which is output.

Next, the case where the direction command signal DIR is the value "1" indicating the second direction, will be described with reference to FIGS. 4A to 4C. In the case where the direction command signal DIR is the value "1" indicating the second direction, the delay unit 22 outputs as a second control signal CONT2 a signal derived by delaying a timing of a state change in the second comparison signal COMP2 whose state is changeable. In this state, the first comparison signal COMP1 is the fixed signal SC whose state does not change. Therefore, the delay unit 22 outputs as the first control signal CONT1 a signal having the same waveform as that of the first comparison signal COMP1.

The output waveforms of the signals shown in FIG. 4A and the corresponding operation of the H-bridge circuit 10 are such that, in the above recitation regarding the example of FIG. 3A and the signal waveforms of FIG. 3A, replacement of the first current detection value VOUT1, the first control signal CONT1, and the first comparison signal COMP1 by the second current detection value VOUT2, the second control signal CONT2, and the second comparison signal COMP2 is performed, and replacement is performed between a relationship between the first switching element 11 and the second switching element 12, and the third switching element 13 and the fourth switching element 14. Therefore, the waveform of the second current detection value VOUT2 in this case is the waveform of the conducting current flowing through the induction load 5. The same applies to the examples of FIGS. 4B and 4C.

Although in the present embodiment, the fixed signal SC is the second voltage level H, the present invention is not limited to this so long as the switching element at the first power supply unit 3 side (first switching element 11 or third switching element 13) is turned OFF, and the switching element at the second power supply unit 4 side (second switching element 12 or fourth switching element 14) is turned ON. For example, the fixed signal SC may be the first voltage level L. Likewise, so long as the above stated control is implemented, signals derived by inverting the voltage levels of the first and second control signals CONT1 and CONT2 and the voltage levels of the first and second comparison signals COMP1 and COMP2 may be used.

Although the switching elements at the first power supply unit 3 side (first switching element 11 and third switching element 13) are P-type MOS transistors, respectively, and the switching elements at the second power supply unit 4 side (second switching element 12 and fourth switching element 14) are N-type MOS transistors, respectively, the present invention is not limited to this so long as the above stated control is enabled. For example, the switching elements at the first power supply unit 3 side may be N-type transistors, respectively, and the switching elements at the second power supply unit 4 side may be P-type transistors. In this case, it is required that a polarity be changed from P to N by shifting a voltage level at a gate terminal of the P-type MOS transistor to a voltage higher than a power supply voltage, and a polarity be changed from N to P by shifting a voltage level at a gate terminal of the N-type MOS transistor to a voltage lower than a ground voltage. Or, the switching elements may be constituted by transistors (e.g., FETs other than DMOS transistors and MOS transistors) other than the P-type MOS transistors and the N-type MOS transistors. Or, transistors other than the transistors at locations (in the present embodiment, the second switching element 12 and the fourth switching element 14) at which the conducting current is to be detected, may be, for example, bipolar transistors such as IGBTs.

Although in the present embodiment, the polarity (P-type or N-type) is changed between the switching elements at the first power supply unit 3 side and the switching elements at the second power supply unit 4 side, and thereby the switching element at the first power supply unit 3 side or the switching element at the second power supply unit 4 side are exclusively turned ON in response to one control signal, all of the switching elements may be constituted by the N-type transistors or the P-type transistors and controls signals may be generated to exclusively turned ON the switching element at the first power supply unit 3 side or the switching element at the second power supply unit 4 side (e.g., each of the first control signal CONT1 and the second control signal CONT 2 may be divided and one of the divided two control signals may be input to an inverter.

The delay unit 22 may be configured anyway so long as the state change of each of the first comparison signal COMP1 and the second comparison signal COMP2 is delayed for a predetermined time. For example, the delay unit 22 may be a delay circuit for delaying the signal based on the clock signal, or a delay element such as a buffer element. Or, delay components of the elements constituting the induction load driving system may be utilized. Although in the present embodiment, the first delay time T1 and the second delay time T2 are described as separate times, they may be an equal time. In other words, it is sufficient that the delay unit 22 has at least one delay component with respect to the first comparison signal COMP1 and the second comparison signal COMP2.

As the comparators 211 and 212 in the comparison unit 21, comparators having hysteresis characteristics may be used. With this configuration, it becomes possible to delay the output of each of the comparators 211, 212 in response to the state change of the input signal. This eliminates a need for a delay unit provided separately, or makes it possible to reduce a delay time of the delay unit 22 (reduce delay element).

Although in the present embodiment, the voltage of the first power supply unit 3 is set higher than the voltage of the second power supply unit 4, the voltage of the first power supply unit 3 may be set lower than the voltage of the second power supply unit 4 (e.g., the voltage of the first power supply unit 3 may be set to a ground voltage and the voltage of the second power supply unit 4 may be set to a power supply voltage). In this case, the reference value REF of the conducting current may be set on the basis of the voltage (power supply voltage) of the second power supply unit 4, and a voltage decrease of a product of the ON-resistance of the switching element at the second power supply unit 4 side and the current flowing through this switching element, with respect to the voltage of the second power supply unit 4, is detected as detection value VOUT1, VOUT2. In other words, although in the present embodiment, the reference value REF of the conducting current is generated on the basis of the voltage of the reference power supply unit 6 in which its voltage is the voltage (ground voltage) of the second power supply unit 4, the present invention is not limited to this. For example, the reference value REF of the conducting current may be set on the basis of the voltage (e.g., power supply voltage) of the first power supply unit 3, and a voltage decrease of a product of the ON-resistance of the switching element at the first power supply unit 3 side and the current flowing through this switching element, with respect to the voltage of the first power supply unit 3, is detected as the detection value VOUT1, VOUT2. In this configuration, also, the same advantages as those achieved by the present embodiment are attained.

Modified example of Embodiment 1

Figure 5:
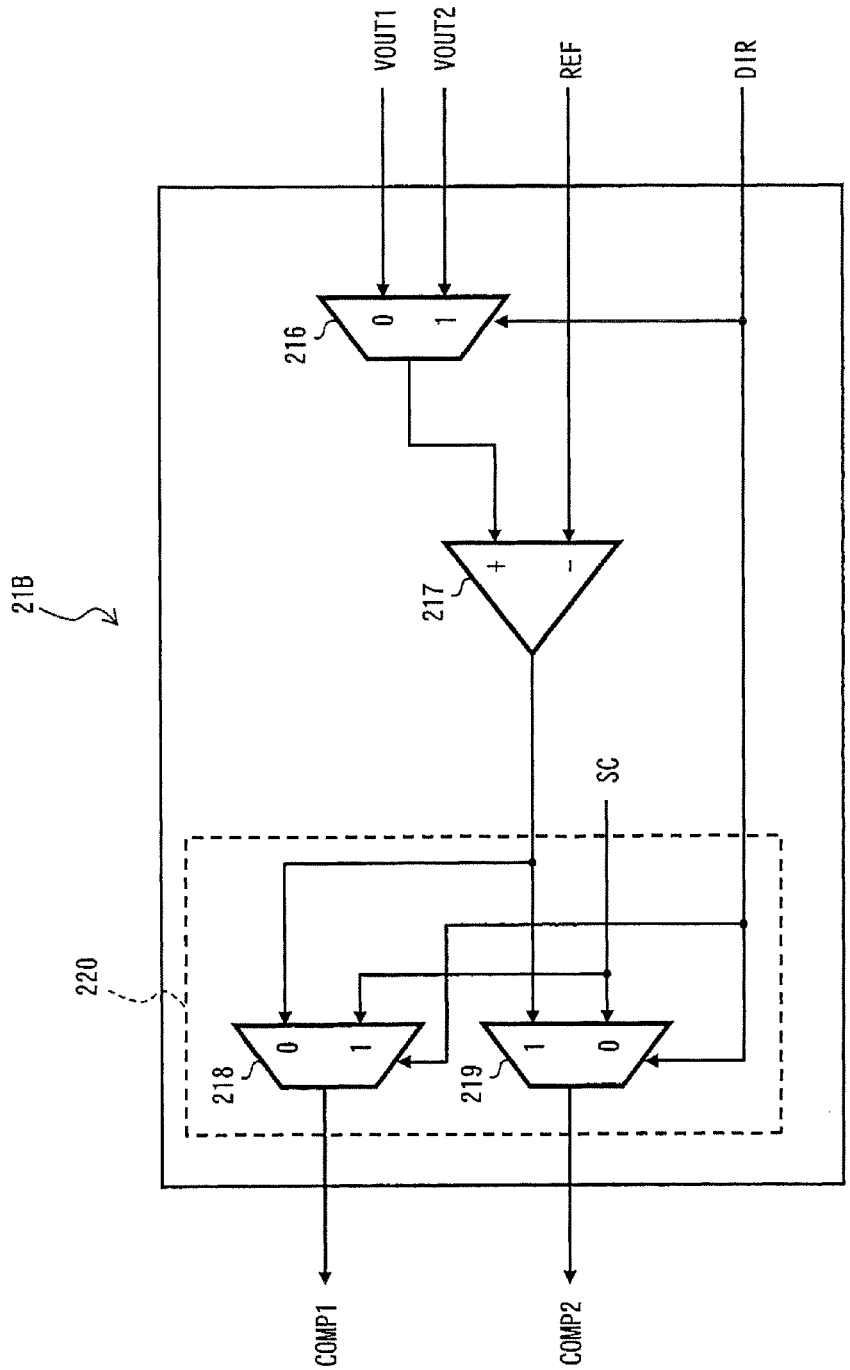
FIG. 5 is a circuit diagram showing a schematic configuration of the comparison unit in an induction load driving system according to a modified example of Embodiment 1 of the present invention.

Next, a modified example of the induction load driving system according to Embodiment 1 of the present invention will be described. The induction load driving system of the present modified example is different from the induction load driving system of Embodiment 1 in the configuration (FIG. 2) of the comparison unit 21 of Embodiment 1. FIG. 5 is a circuit diagram showing a schematic configuration of the comparison unit in the induction load driving system according to the modified example of Embodiment 1 of the present invention. In the present modified example, the same components as those of Embodiment 1 are designated by the same reference symbols and will not be described in repetition. In the present modified example, the overall configuration (FIG. 1) of the induction load driving system and the output waveforms (FIGS. 3A to 3C and 4A to 4C) are similar to those of Embodiment 1. A comparison unit 21B of the present modified example is configured to include only one comparator.

In the present modified example, the comparison unit 21B includes a detection value selection unit 216 which receives as inputs the first current detection value VOUT1 and the second current detection value VOUT2, outputs the first current detection value VOUT1 when the direction command signal DIR indicates the first direction, and outputs the second current detection value VOUT2 when the direction command signal DIR indicates the second direction. In addition, the comparison unit 21B includes a comparator 217 which compares the first current detection value VOUT1 or the second current detection value VOUT2 which is selected by the detection value selection unit 216 to the reference value REF of the conducting current. In brief, in the present modified example, the comparison unit 21B is configured to select a desired one of the first current detection value VOUT1 and the second current detection value VOUT2 in response to the direction command signal DIR and compare the first current detection value VOUT1 or the second current detection value VOUT2 which is used to perform current driving, to the reference value REF of the conducting current.

Furthermore, the comparison unit 21B includes a first multiplexer circuit 218 which receives as inputs an output signal of the comparator 217 and a fixed signal SC fixed in a predetermined voltage level (in the modified example, second voltage level H higher than the first voltage level L), selects the output signal of the comparator 217 or the fixed signal SC and outputs a first comparison signal COMP1 according to the direction command signal DIR, and a second multiplexer circuit 219 which receives as inputs an output signal of the comparator 217 and the fixed signal SC fixed in the predetermined voltage level (in the modified example, second voltage level H), selects the output signal of the comparator 217 or the fixed signal SC and outputs a second comparison signal COMP2 according to the direction command signal DIR.

The first multiplexer circuit 218 and the second multiplexer circuit 219 constitute a signal selection unit 220. Specifically, when the direction command signal DIR indicates the first direction, and the first current detection value VOUT1 is equal to or greater than the reference value REF of the conducting current, based on the output of the comparator 217, the signal selection unit 220 outputs as the first comparison signal COMP1 a signal for causing the one end 5A of the induction load 5 to be connected to the second power supply unit 4. On the other hand, when the first current detection value VOUT1 is less than the reference value REF of the conducting current, the signal selection unit 220 outputs as the first comparison signal COMP1 a signal for causing the one end 5A of the induction load 5 to be connected to the first power supply unit 3. In these cases, in addition to the first comparison signal COMP1, the signal selection unit 220 outputs as the second comparison signal COMP2 the fixed signal SC for causing the other end 5B of the induction load 5 to be connected to the second power supply unit 4.

When the direction command signal DIR indicates the second direction, the signal selection unit 220 outputs as the first comparison signal COMP1 the fixed signal SC for causing the one end 5A of the induction load 5 to be connected to the second power supply unit 4. In addition to the first comparison signal COMP1, when the second current detection value VOUT2 is equal to or greater than the reference value REF of the conducting current based on the output of the comparator 217, the signal selection unit 220 outputs as the second comparison signal COMP2 a signal for causing the other end 5B of the induction load 5 to be connected to the second power supply unit 4. On the other hand, when the second current detection value VOUT2 is less than the reference value REF of the conducting current based on the output of the comparator 217, the signal selection unit 220 outputs as the second comparison signal COMP2 a signal for causing the other end 5B of the induction load 5 to be connected to the first power supply unit 3.

In the modified example, also, when the conducting current flows through the induction load 5 in the same direction, switching is performed for the two switching elements which are exclusively turned ON in response to one control signal, among the four switching elements 11, 12, 13, and 14 constituting the H-bridge circuit 10. Thus, switching between the bias state and the back-flow state can be implemented easily.

Embodiment 2

Figure 6:
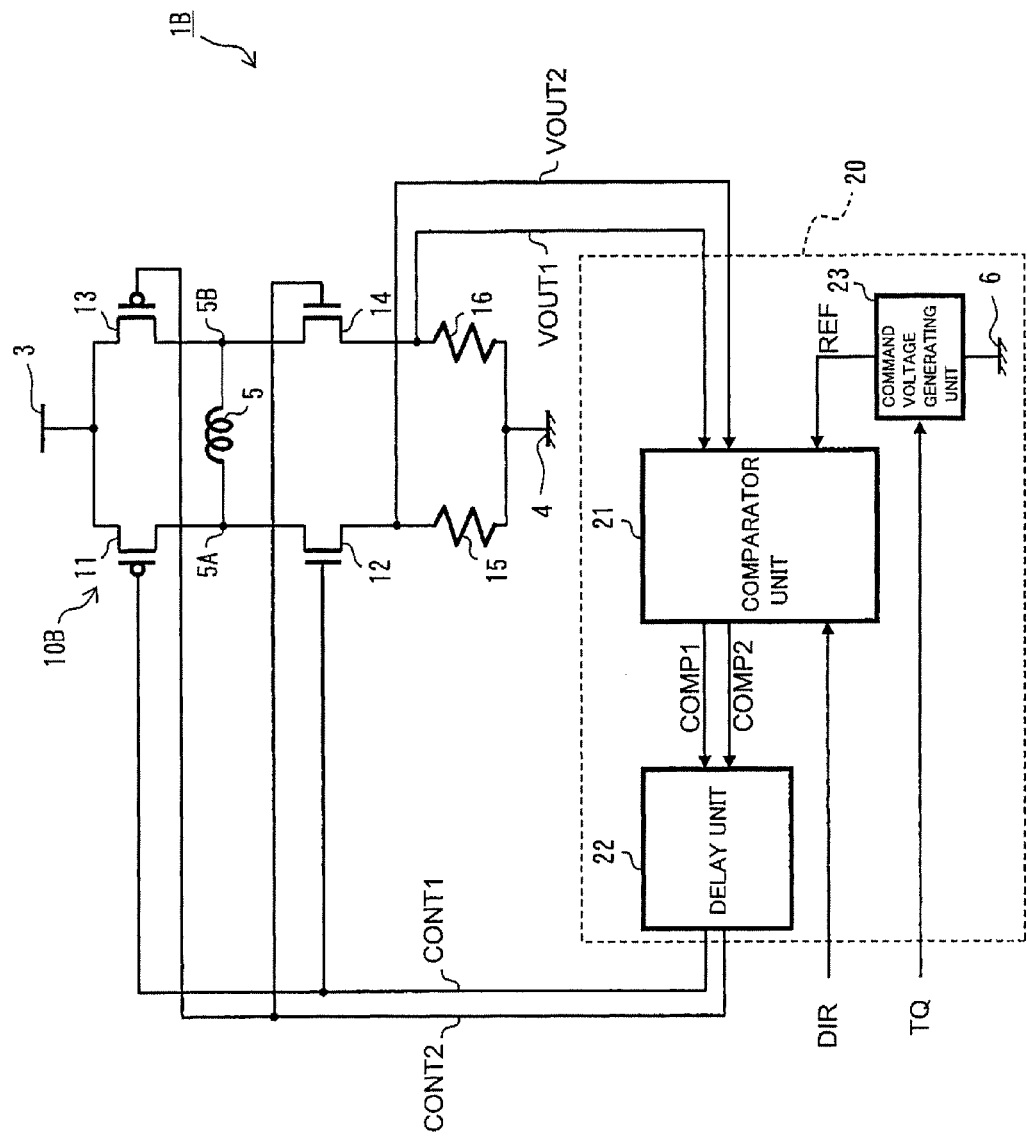
FIG. 6 is a circuit diagram showing a schematic configuration of an induction load driving system according to Embodiment 2 of the present invention.
Figure 7:
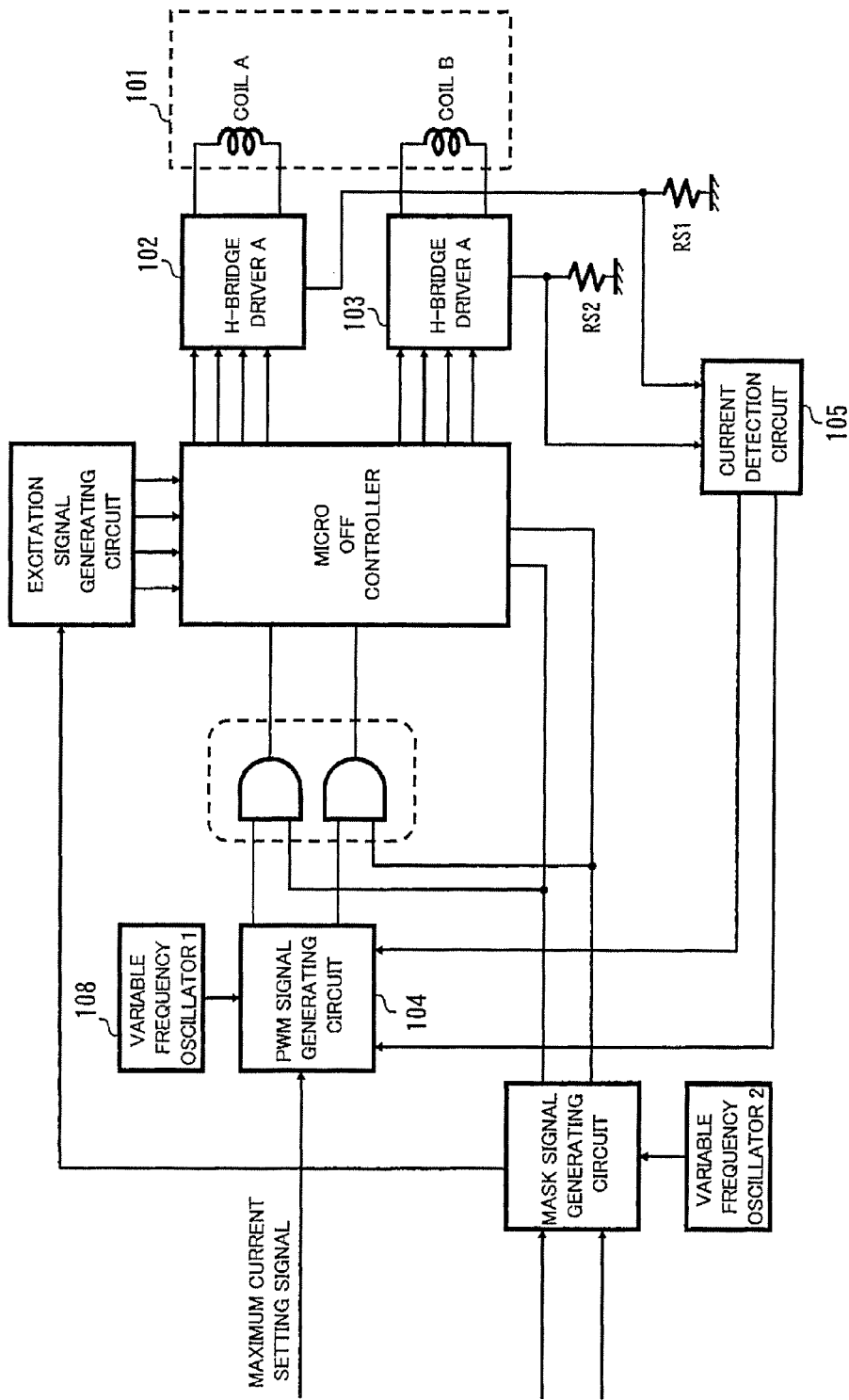
FIG. 7 is a schematic circuit diagram showing an exemplary conventional induction load driving system.
Figure 8:
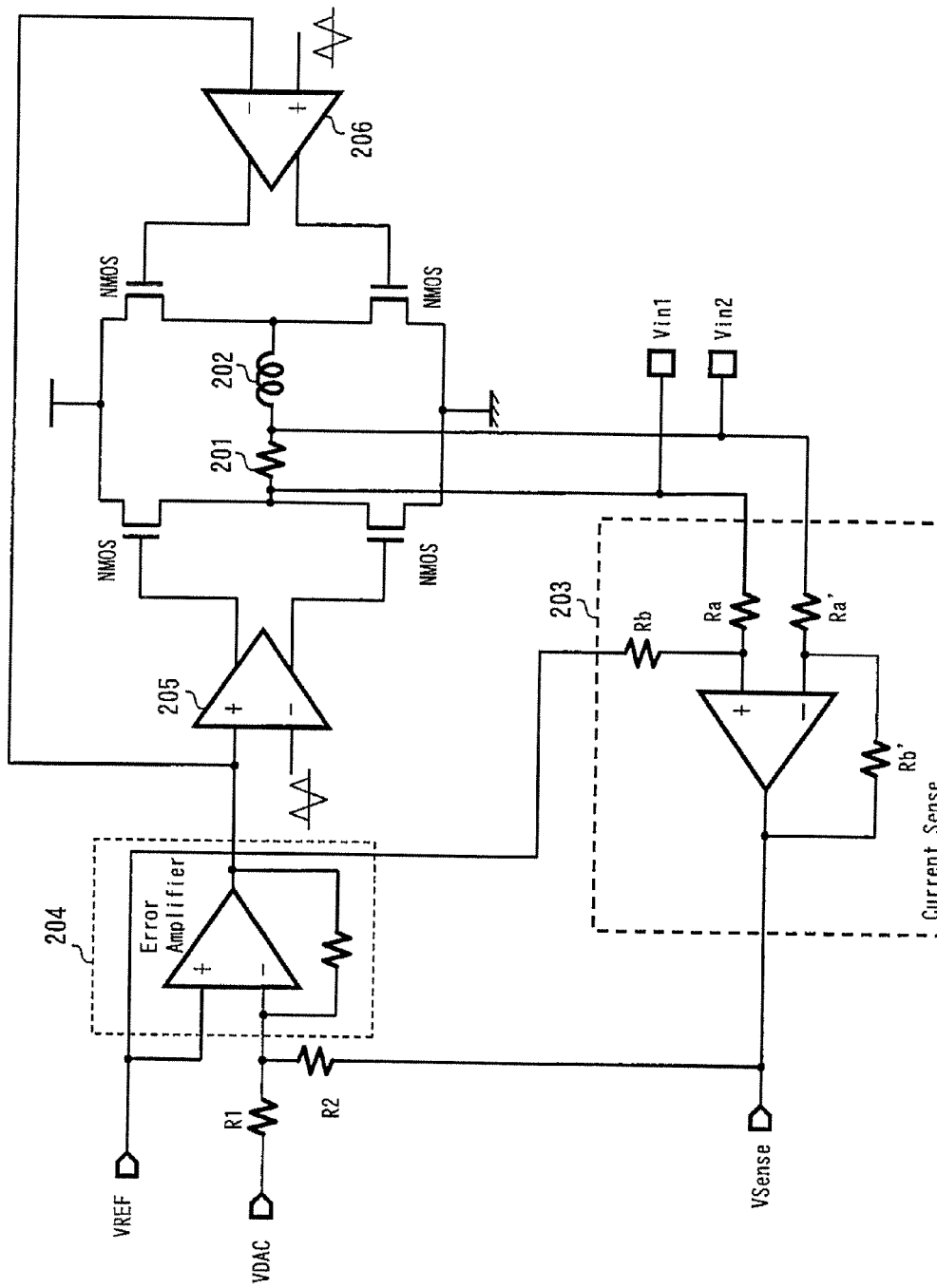
FIG. 8 is a schematic circuit diagram showing another exemplary conventional induction load driving system.
Figure 9:
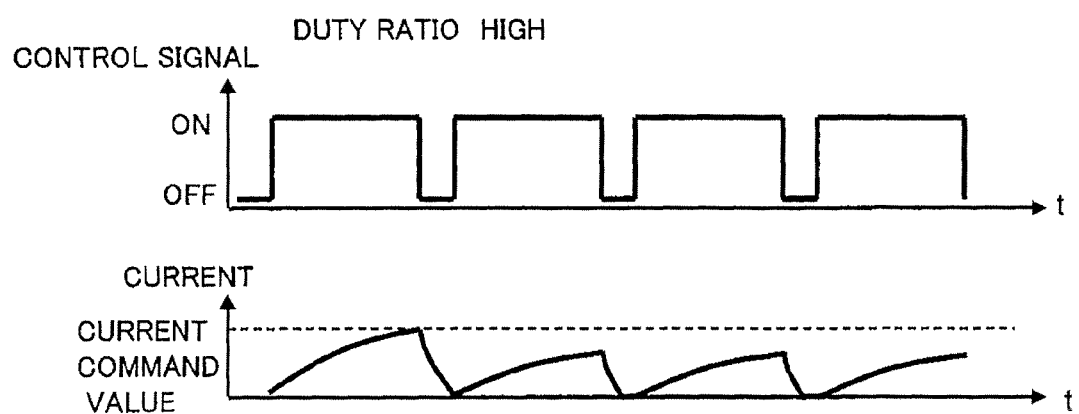
FIG. 9 is a view showing a current waveform in response to a control signal, to describe a problem associated with a conventional induction load driving system.

Next, an induction load driving system according to Embodiment 2 of the present invention will be described. FIG. 6 is a circuit diagram showing a schematic configuration of the induction load driving system according to Embodiment 2 of the present invention. In the present embodiment, the same components as those of Embodiment 1 are designated by the same reference symbols and will not be described in repetition. An induction load driving system 1B of the present embodiment is different from the induction load driving system 1 of Embodiment 1 in that a H-bridge circuit 10B of the present embodiment is configured in such a manner that one end of a main terminal of the second switching element 12 is connected to the second power supply unit 4 via a first detection resistor element 15, and one end of a main terminal of the fourth switching element 14 is connected to the second power supply unit 4 via a second detection resistor element 16.

In this case, the reference value REF of the conducting current is set to a voltage (command voltage) in which the voltage (ground voltage) of the second power supply unit 4 is a reference voltage. The control signal generating circuit 20 is configured to detect as the first current detection value VOUT1 a voltage between the fourth switching element 14 and the second detection resistor element 16 on the basis of the voltage of the second power supply unit 4 in which its voltage is the reference voltage, and to detect as the second current detection value VOUT2 a voltage between the second switching element 12 and the first detection resistor element 15 on the basis of the voltage of the second power supply section 4 in which its voltage is the reference voltage.

In such a configuration, since the conducting current flows through the corresponding detection resistor element 15, 16 in the back-flow state, it becomes possible to effectively detect the conducting current even in both of the bias state and the back-flow state.

In the present embodiment, the switching elements are not limited to the MOS transistors. In particular, in the present embodiment, the ON-resistance of the switching element is not necessary. Because of this, bipolar transistors may be used as all of the switching elements. Moreover, in the present embodiment, the reference value REF of the conducting current may be set on the basis of the voltage (e.g., power supply voltage) of the first power supply unit 3, or the voltage of the first power supply unit 3 may bet set to a voltage lower than the voltage of the second power supply unit 4.

Although the embodiments of the present invention have been described, the present invention is not limited to the above described embodiments, but may be improved, changed, or modified within a scope of the invention. For example, the components in the above described plurality of embodiments and modified example may be suitably combined as desired. In the present invention, the phrase "one end of the main terminal of the switching element is connected to the first power supply unit 3 (or second power supply unit 4)" is meant to include a configuration in which they are connected to each other indirectly as well as or a configuration in which they are connected to each other directly. That is, the first switching element 11 and the third switching element 13 may be directly connected to the first power supply unit 3 as in the configuration of Embodiment 1, or indirectly connected to the first power supply unit 3, for example, via an element. Also, the second switching element 12 and the fourth switching element 14 may be directly connected to the second power supply unit 4 as in the configuration of Embodiment 1, or indirectly connected to the second power supply unit 4, for example, via an element, as in the configuration of Embodiment 2.

An induction load driving system of the present invention is effectively used to reduce a current ripple for an induction load having a low time constant with a simple configuration.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. An induction load driving system comprising:
    a H-bridge circuit including four switching elements which are two switching elements connected to one end of an induction load and two switching elements connected to the other end of the induction load, the H-bridge circuit being connected between a first power supply unit and a second power supply unit in which its voltage is different from a voltage of the first power supply unit; and
    a control signal generating circuit configured to, according to a direction in which the conducting current flows through the induction load, generate a control signal to fix a state in which the two switching elements connected to one of the one end and the other end of the induction load are exclusively turned ON, and to perform switching to exclusively turn ON the two switching elements connected to the other of the one end and the other end of the induction load based on the conducting current flowing through the induction load;
    wherein the control signal generating circuit is configured to exclusively turn ON the two switching elements connected to the other of the one end and the other end of the induction load to increase the conducting current after a passage of a first predetermined delay time after the conducting current becomes less than a preset reference value of the conducting current when the conducting current becomes less than the preset reference value, and
    the control signal generating circuit is configured to exclusively turn ON the two switching elements connected to the other of the one end and the other end of the induction load to decrease the conducting current after a passage of a second predetermined delay time after the conducting current becomes equal to or greater than the preset reference value of the conducting current when the conducting current becomes equal to or greater than the preset reference value.

2. The induction load driving system according to claim 1, wherein the H-bridge circuit includes:
    a first switching element having a main terminal one end of which is connected to the first power supply unit and the other end of which is connected to the one end of the induction load;
    a second switching element having a main terminal one end of which is connected to the second power supply unit in which its voltage is different from the voltage of the first power supply unit and the other end of which is connected to the one end of the induction load;
    a third switching element having a main terminal one end of which is connected to the first power supply unit and the other end of which is connected to the other end of the induction load; and
    a fourth switching element having a main terminal one end of which is connected to the second power supply unit and the other end of which is connected to the other end of the induction load;
    wherein the control signal generating circuit is configured to:
    receive as inputs a direction command signal for switching a direction of the conducting current flowing through the induction load between a first direction from the one end of the induction load toward the other end of the induction load and a second direction from the other end of the induction load toward the one end of the induction load, and a current command signal for setting a reference value of the conducting current flowing through the induction load, on the basis of the voltage (reference voltage) of the second power supply unit, and
    based on the command direction signal and the current command signal, generate a first control signal for causing the first switching element and the second switching element to be exclusively turned ON to connect the one end of the induction load to the first power supply unit or to the second power supply unit and outputs the first control signal to a control terminal of the first switching element and to a control terminal of the second switching element, and generate a second control signal for causing the third switching element and the fourth switching element to be exclusively turned ON to connect the other end of the induction load to the first power supply unit or to the second power supply unit and outputs the second control signal to a control terminal of the third switching element and to a control terminal of the fourth switching element;

wherein the control signal generating circuit is configured to:

when the direction command signal indicates the first direction, output as the second control signal a signal for causing the other end of the induction load to be connected to the second power supply unit, detect a value (hereinafter referred to as first current detection value) based on the conducting current flowing through the induction load and compare the first current detection value to the reference value of the conducting current, output as the first control signal a signal for causing the one end of the induction load to be connected to the first power supply unit after a passage of a first predetermined delay time after the first current detection value has become less than the reference value of the conducting current, when the first current detection value has become less than the reference value of the conducting current, and output as the first control signal a signal for causing the one end of the induction load to be connected to the second power supply unit after a passage of a second predetermined delay time after the first current detection value has become equal to or greater than the reference value of the conducting current, when the first current detection value has become equal to or greater than the reference value of the conducting current, and wherein the control signal generating circuit is configured to:

when the direction command signal indicates the second direction, output as the first control signal a signal for causing the one end of the induction load to be connected to the second power supply unit, detect a value (hereinafter referred to as second current detection value) based on the conducting current flowing through the induction load and compare the second current detection value to the reference value of the conducting current, output as the second control signal a signal for causing the other end of the induction load to be connected to the first power supply unit after a passage of the first predetermined delay time after the second current detection value has become less than the reference value of the conducting current, when the second current detection value has become less than the reference value of the conducting current, and output as the second control signal a signal for causing the other end of the induction load to be connected to the second power supply unit after a passage of the second predetermined delay time after the second current detection value has become equal to or greater than the reference value of the conducting current, when the second current detection value has become equal to or greater than the reference value of the conducting current.

3. The induction load driving system according to claim 2, wherein the first current detection value is a voltage applied to the fourth switching element on the basis of the reference voltage; and wherein the second current detection value is a voltage applied to the second switching element on the basis of the reference voltage.

4. The induction load driving system according to claim 2, wherein the H-bridge circuit is configured such that one end of the main terminal of the second switching element is connected to the second power supply unit via a first detection resistor element and one end of the main terminal of the fourth switching element is connected to the second power supply unit via a second detection resistor element;

wherein the first current detection value is a voltage between the fourth switching element and the second detection resistor element on the basis of the reference voltage; and wherein the second current detection value is a voltage between the second witching element and the first detection resistor element on the basis of the reference value.

5. The induction load driving system according to claim 2, wherein the control signal generating circuit includes:

a comparison unit including:

a first comparator configured to compare the first current detection value to the reference value of the conducting current;

a second comparator configured to compare the second current detection value to the reference value of the conducting current; and a signal selection unit;

the signal selection unit being configured to, when the direction command signal indicates the first direction and the first current detection value is equal to or greater than the reference value of the conducting current according to an output of the first comparator, output as a first comparison signal a signal for causing the one end of the induction load to be connected to the second power supply unit and output as a second comparison signal a fixed signal for causing the other end of the induction load to be connected to the second power supply unit;

the signal selection unit being configured to, when the direction command signal indicates the first direction and the first current detection value is less than the reference value of the conducting current according to the output of the first comparator, output as the first comparison signal a signal for causing the one end of the induction load to be connected to the first power supply unit and output as the second comparison signal the fixed signal for causing the other end of the induction load to be connected to the second power supply unit; and the signal selection unit being configured to, when the direction command signal indicates the second direction and the second current detection value is equal to or greater than the reference value of the conducting current according to the output of the second comparator, output as the second comparison signal a signal for causing the other end of the induction load to be connected to the second power supply unit, and output as the first comparison signal a fixed signal for causing the one end of the induction load to be connected to the second power supply unit; and the signal selection unit being configured to, when the direction command signal indicates the second direction and the second current detection value is less than the reference value of the conducting current according to the output of the second comparator, output as the second comparison signal a signal for causing the other end of the induction load to be connected to the first power supply unit, and output as the first comparison signal a fixed signal for causing the one end of the induction load to be connected to the second power supply unit; and a delay unit configured to generate the first control signal such that it delays for the first delay time a state change in the first comparison signal at a time point when the first current detection value becomes less than the reference value of the conducting current and it delays for the second delay time the state change in first comparison signal at a time point when the first current detection value becomes equal to or greater than the reference value of the conducting current, and generate the second control signal such that it delays for the first delay time a state change in the second comparison signal at a time point when the second current detection value becomes less than the reference value of the conducting current and it delays for the second delay time the state change in second comparison signal at a time point when the second current detection value becomes equal to or greater than the reference value of the conducting current.

6. The induction load driving system according to claim 2, wherein the control signal generating circuit includes:

a comparison unit including:

a detection value selection unit which receives as inputs the first current detection value and the second current detection value, outputs the first current detection value when the direction command signal indicates the first direction and outputs the second current detection value when the direction command signal indicates the second direction;

a comparator configured to compare either the first current detection value or the second current detection value which is selected by the detection value selection unit to the reference value of the conducting current; and a signal selection unit;

the signal selection unit being configured to, when the direction command signal indicates the first direction and the first current detection value is equal to or greater than the reference value of the conducting current according to an output of the comparator, output as a first comparison signal a signal for causing the one end of the induction load to be connected to the second power supply unit and output as a second comparison signal a fixed signal for causing the other end of the induction load to be connected to the second power supply unit;

the signal selection unit being configured to, when the direction command signal indicates the first direction and the first current detection value is less than the reference value of the conducting current according to the output of the comparator, output as the first comparison signal a signal for causing the one end of the induction load to be connected to the first power supply unit and output as the second comparison signal the fixed signal for causing the other end of the induction load to be connected to the second power supply unit; and the signal selection unit being configured to, when the direction command signal indicates the second direction and the second current detection value is equal to or greater than the reference value of the conducting current according to the output of the comparator, output as the first comparison signal a fixed signal for causing the one end of the induction load to be connected to the second power supply unit, and output as the second comparison signal a signal for causing the other end of the induction load to be connected to the second power supply unit; and the signal selection unit being configured to, when the direction command signal indicates the second direction and the second current detection value is less than the reference value of the conducting current according to the output of the comparator, output as the first comparison signal the fixed signal for causing the one end of the induction load to be connected to the second power supply unit, and output as the second comparison signal a signal for causing the other end of the induction load to be connected to the first power supply unit; and a delay unit configured to generate the first control signal such that it delays for the first delay time a state change in the first comparison signal at a time point when the first current detection value becomes less than the reference value of the conducting current and it delays for the second delay time the state change in first comparison signal at a time point when the first current detection value becomes equal to or greater than the reference value of the conducting current, and generate the second control signal such that it delays for the first delay time a state change in the second comparison signal at a time point when the second current detection value becomes less than the reference value of the conducting current and it delays for the second delay time the state change in second comparison signal at a time point when the second current detection value becomes equal to or greater than the reference value of the conducting current.

7. The induction load driving system according to claim 2, wherein the control signal generating circuit is configured to change the first delay time and the second delay time.

* * * * *